United States Patent
Somani et al.

(10) Patent No.: US 6,718,173 B1
(45) Date of Patent: Apr. 6, 2004

(54) LOCATION INFORMATION RECOVERY AND MANAGEMENT FOR MOBILE NETWORKS

(75) Inventors: Arun K. Somani, Ames, IA (US); Govindarajan Krishnamurthy, North Billerica, MA (US)

(73) Assignee: Iowa State University Research Foundation, Ames, IA (US)

( * ) Notice: Subject to any disclaimer, the term of this patent is extended or adjusted under 35 U.S.C. 154(b) by 0 days.

(21) Appl. No.: 09/409,130

(22) Filed: Sep. 30, 1999

(51) Int. Cl.[7] .................................................. H04Q 7/20
(52) U.S. Cl. .................. 455/456.1; 455/432; 455/435; 455/433; 455/445; 370/331; 370/338; 370/407; 707/200
(58) Field of Search ................................. 455/435, 432, 455/445, 433, 456; 707/200, 204; 709/40; 370/331, 338, 407

(56) References Cited

U.S. PATENT DOCUMENTS

| | | | | |
|---|---|---|---|---|
| 5,570,412 A | * | 10/1996 | LeBlanc ..................... | 455/456 |
| 5,835,757 A | * | 11/1998 | Oulid-Aissa et al. ......... | 707/10 |
| 5,889,770 A | * | 3/1999 | Jokiaho et al. .............. | 370/337 |
| 6,052,598 A | * | 4/2000 | Rudrapatna et al. ........ | 455/436 |
| 6,112,095 A | * | 8/2000 | Wax et al. .................. | 455/115 |
| 6,115,599 A | * | 9/2000 | Stilp ......................... | 455/102 |
| 6,167,274 A | * | 12/2000 | Smith ..................... | 342/357.01 |
| 6,185,426 B1 | * | 2/2001 | Alperovich et al. .......... | 379/45 |
| 6,259,776 B1 | * | 7/2001 | Hunt ..................... | 379/114.01 |
| 6,282,426 B1 | * | 8/2001 | Wang ......................... | 342/450 |
| 6,324,405 B1 | * | 11/2001 | Young et al. .............. | 455/12.1 |
| 6,347,227 B1 | * | 2/2002 | Johansson ................... | 455/432 |
| 6,381,456 B1 | * | 4/2002 | Ko ............................. | 455/411 |
| 2002/0005804 A1 | * | 1/2002 | Suprunov ................... | 342/457 |

FOREIGN PATENT DOCUMENTS

| EP | 1189474 A1 | * | 3/2002 | ............ H04Q/3/00 |
|---|---|---|---|---|

OTHER PUBLICATIONS

Krishnamurthi et al., "Effect of Failures on Optimal Location Management Algorithms," Proceedings of Fault Tolerant Computing Symposium, Jun. 1999, pp. 1–20.

Krishnamurthi et al., "Fast Recovery Protocol for Database and Link Failures in Mobile Networks," Proceedings of International Conference on Computer Communications and Networking, Oct. 1998, 8 Pages.

Krishnamurthi et al., "Optimal Replication of Location Information in Mobile Networks," Proceedings of Int'l Communications Conference, Jun. 1999, 5 Pages.

* cited by examiner

Primary Examiner—William Trost
Assistant Examiner—Marcos Torres
(74) Attorney, Agent, or Firm—Fish & Richardson P.C., P.A..

(57) ABSTRACT

Systems and methods for recovering and managing location information in mobile communication networks using a fast recovery protocol and load balanced query and update processes. According to the fast recovery protocol, if a location update processor does not receive a message from a global database server acknowledging receipt by the global database server of a location update message after a predetermined retry interval has elapsed since the location update message was sent by the location update processor, the location update processor sends a location update retry message after each predetermined retry interval elapses until the location update processor receives an acknowledgement message from the global database server. The global database server can use the location update retry messages and the predetermined retry interval to recover from a database or link failure. The recovery period using the fast recovery protocol is bounded by the predetermined retry interval. The fast recovery protocol can also be used in a system having a distributed location information database architecture. The load balanced query and update processes can be used to query and update, respectively, the databases of the distributed location information database architecture.

36 Claims, 19 Drawing Sheets

LOCATION INFORMATION RECOVERY AND MANAGEMENT FOR MOBILE NETWORKS

BACKGROUND

The present invention relates to communication networks. More particularly, the present invention relates to a system and method for recovering and managing location information in mobile communication networks.

Communications networks that include mobile stations such as cellular telephones typically include some mechanism for tracking the location of the mobile hosts (sometimes referred to herein as "mobiles") in order to establish connections with the mobile hosts. Generally, each mobile reports its location to the mobile communication network, which stores the location information in one or more location information databases (LIDs). The location information is later retrieved from the LID to establish connections with the mobiles. Conventional approaches to updating the location information for mobiles include having each mobile send a location update message after either a predetermined time period has elapsed and/or the mobile has moved a predetermined distance since the mobile last sent a location update message.

A conventional mobile communication network 10 of the type generally referred to as a personal communications services network (PCS) is shown in FIG. 1. The mobile communication network 10 has a conventional cellular architecture for providing more efficient use of bandwidth. The mobile communication network comprises a plurality of cells 12 in which mobiles can be located. Each cell 12 has a base station 14 (shown in FIG. 2) for establishing wireless links with mobiles 16 (shown in FIG. 2) in the cell 12.

A set of base stations 14 is controlled by a base station controller (BSC) 18 (shown in FIG. 1). The primary function of a BSC 18 is to manage the radio resources of the base stations 14 controlled by the BSC 18, for example, by performing call hand-off and allocating radio channels. Each BSC 18 is connected to a mobile switching center (MSC) 20 through a wired network 22. Each MSC 20 is typically connected to more than one BSC 18 and has a location area 24 that includes all of the cells 12 under the control of BSCs 18 that are connected to the MSC 20. The MSC 20 typically provides switching functions and coordinates location registration and call delivery for mobiles 16 located within the location area 24 of the MSC 20. Each MSC 20 has access to the location information databases in the mobile communication network 10, which are used to store location and service information for each registered mobile 16 of the mobile communication network 10.

Mobile communication networks 10 that comply with the IS-41 standard (which is described in EIA/TIA, "Cellular Radio Telecommunications Intersystems Operation," PN-2991, November 1995, and is incorporated by reference) use a two-level hierarchy of location information databases for location management. Location information databases that adhere to the IS-41 standard have a home location register (HLR) 26 and one or more visitor location registers (VLRs) 28. The HLR 26 is a global database in which information (including location information) about all mobiles 16 registered in the mobile communication network 10 is stored. Each VLR 28 is typically associated with a single MSC 20 and stores information (including location information) about mobiles visiting the location area 24 of the MSC 20 associated with that VLR 28.

In mobile communication networks 10 that comply with the IS-41 standard, the HLR 26 and the VLRs 28 are updated with location information from mobiles 16 as shown in FIG. 3. Initially, a mobile 16 is located in a first location area 24a that is associated with a first MSC 20a and a first VLR 28a (which has an entry for the mobile 16). Then the mobile 16 moves into a second location area 24b associated with a second MSC 20b and a second VLR 28b. The mobile 16 sends a location update message 30 to the second MSC 20b, and the MSC 20b sends a location update message 32 containing location information about the mobile 16 to the HLR 26. After receiving the location update message 32, the HLR 26 updates the entry that the HLR 26 has for the mobile 16 with the location information contained in the location update message 32, sends a confirmation message 34 back to the second MSC 20b, and sends a deletion message 36 to the first MSC 20a. After receiving the confirmation message 34 from the HLR 26, the second MSC 20b creates an entry in the second VLR 28b for storing the location information for the mobile. After receiving the deletion message 36 from the HLR 28, the first MSC 20a deletes the entry for the mobile 16 in the first VLR 28a.

The call delivery protocol (CDP) of the IS-41 specifies how the location information stored in the location information databases can be used to complete telephone calls between first and second mobiles 16a and 16b. As shown in FIG. 4. when the first mobile 16a places a telephone call to the second mobile 16b, the first mobile 16a sends a call delivery request (CDR) 40 to the first MSC 20a. The first MSC 20a queries the first VLR 28a associated with the first MSC 20a to determine if the first VLR 28a has an entry for the second mobile 16b. If the first VLR 28a has an entry for the second mobile 16b, i.e., if the second mobile 16b is located within the first location area 24a associated with the first MSC 20a and the first VLR 28a, the first MSC 20a establishes a connection between the first and second mobiles 16a and 16b, assuming the second mobile 16b is in a mode to receive calls. If the first VLR 28a does not have an entry for the second mobile 16b, i.e., if the second mobile 16b is not located within the first location area 24a, the first MSC 20a sends a query 42 to the HLR 26 for the second mobile's 16b location information. The HLR 26 determines the current location area 24b for the second mobile 16b from the entry stored in the HLR 26 for the second mobile 16b and sends a route request 44 to the second MSC 20b that is associated with the location area 24b in which the second mobile 16b is located. The second MSC 20b determines a temporary location directory number for the second mobile 16b (assuming the second mobile is in a mode to receive calls) and transfers the information 46 to the HLR 26. The HLR 26 sends the information 48 to the first MSC 20a, and the MSC 20a establishes a connection 50 between the first and second mobiles 16a and 16b. If a fixed host (that is, a host in the wired network) calls the first mobile 16a, the call is routed to the first MSC 20a using the location information in the HLR 26. If the first mobile 16a calls a fixed host, the first MSC 20a establishes the connection with the fixed host without referring to the HLR 26; therefore, the delivery of a call from the first mobile 16a to a fixed host does not depend on the state of the HLR 26.

Therefore, calls between two mobiles in different location areas and calls from a fixed host to a mobile typically cannot be completed without using the location information stored in the HLR 26. As a result, if the location information stored in the HLR 26 is inaccessible, calls between two mobiles in different location areas and calls from a fixed host to a mobile typically cannot be completed and will be dropped.

The HLR 26 will be inaccessible, for example, because the HLR 26 is inoperable, referred to herein as a "database failure," or because the portion of the mobile communication network 10 providing access to the HLR 26 is inoperable, referred to herein as a "link failure." To avoid extended periods where the HLR 26 is inoperable, conventional mobile communication networks 10 use HLRs 26 that can be restored relatively quickly after a database failure so that the time in which the HLR 26 is inoperable (referred to herein as the "failure period") is minimized. Such conventional HLRs 26 typically have fail-stop, stable disk storage, e.g., redundant arrays of disks. Also, it is known to periodically back up the volatile memory of such HLRs 26 to the disk storage and to log transactions on the disk storage between backups.

Even after the failure has been removed from the mobile communication network 10, calls that rely on information in the HLR 26 in order to be completed can still not be completed because the mobiles 16 registered with the HLR 26 may have moved to different location areas during the failure period. Because the HLR 26 is inaccessible during a failure period, the location update messages that are sent to the HLR 26 when the mobile 16 enters a new location area 24 cannot be properly processed by the HLR 26. Therefore, even though the HLR 26 is restored to the state the HLR 26 was in just prior to the failure, the HLR 26 may not reflect the current location of any mobiles 16 that have moved during the failure period. This period in which the state of the HLR 26 may not reflect the current location of a mobile 16 registered with the HLR 26 is referred to herein as the "recovery period." For each mobile 16 registered with the HLR 26, the recovery period starts when the HLR 26 becomes accessible after a database failure or a link failure and ends when the contents of the HLR 26 have been updated and/or verified to contain the current location information for that mobile 16.

One known approach to updating and/or verifying (collectively referred to herein as "recovering") the entries stored in the HLR 26 for each mobile 16 registered therewith involves sending an unreliable roamer data directive (URDD) to the VLRs 28 associated with the HLR 26. In response to the URDD, each VLR 28 removes from its database those entries for the mobiles 16 registered with the HLR 26. Subsequently, the HLR 26 is reconstructed in an incremental fashion as each mobile 16 registered with the HLR 26 confirms the mobile's location by making a call or by sending a location update message when the mobile 16 enters a new location area 24. The IS-41 standard, referred to above, also specifies that each mobile 16 should periodically transmit location update messages, regardless of whether the mobile 16 has entered a new location area and regardless of the state of the HLR 26, in order to reduce the recovery period. During the failure period and recovery period, all calls made to the mobile 16 will not be completed.

The IS-41 standard recovery process has the following primary drawbacks. A periodic location update message is sent from each mobile 16 regardless of the state of the HLR 26, which wastes wireless bandwidth when periodic location update messages are transmitted when the HLR 26 is not in a recovery period. This drawback is magnified if the population of mobiles 16 is large. The periodic transmission of location update messages as required by the IS-41 standard also results in power drain for the mobiles 16. However, for such an approach to be effective, the frequency of the periodic location update messages must be comparable to the frequency of incoming calls. In addition, any further reduction in the recovery period can only be achieved by increasing the frequency of the periodic location update messages, which results in greater use of the wireless bandwidth, greater power drain for the mobiles 16, and a greater load on the HLR 26.

Another known recovery approach addresses the limitations of using a fixed location update message transmission interval by using a variable location update message transmission interval that is a function of various network parameters (such as call arrival rates, mobility rates, and mean time between HLR failures) in order to optimize the periodic location update message transmission interval. In order to adapt to changes in the network parameters efficiently, the network has to periodically feed data to the mobiles 16 in the network. This increases the processing load of the mobiles 16, which results in further power drain and requires that the mobiles 16 possess computational and storage abilities to adapt the location update message transmission interval based on the received data.

Yet another known recovery process has the HLR 26, after a failure has been removed, get the current location information from the VLRs 28. To reduce the amount of information to be exchanged, the HLR 26 requests only the information about mobiles 16 that have moved after the last checkpoint the HLR 26 took before the failure. If the HLR 26 is not checkpointed frequently, this approach may require high communication overhead resulting from the large amounts of information being transferred from the plurality of VLRs 28 to the HLR 26. Also, in such an approach, the clocks of the HLRs 26 and VLRs 28 must be synchronized.

Therefore, there is a continuing need for an improved location information recovery and management system and method.

SUMMARY

Implementations may include one or more of the following features. In one aspect, a method for managing information concerning the location of a mobile device in a mobile communication network may include maintaining a location database that stores location information indicative of the location of the mobile device. The method also may include receiving location update messages from the mobile device via a location update processor associated with a particular location area within the network when the location of the mobile device changes. In addition, the method may include transmitting the location update messages to the location database. In the event one of the location update messages is not received by the location database, location update retry messages are transmitted at the end of successive retry intervals until one of the location update retry messages is received.

In another aspect, a mobile communication network may include a mobile device, a location database server having a location database storing location information indicative of the location of the mobile device, and a location update processor. The location update processor receives location update messages from the mobile device when the location of the mobile device changes and transmits the location update messages to the location database. In the event one of the location update messages is not received by the location database, the location update processor transmits location update retry messages at the end of successive retry intervals until one of the location update retry messages is received.

In another aspect, a location database server may include a location database and a recovery processor. The location database server receives location update messages and location update retry messages. The location update messages are transmitted by a location update processor when a mobile device enters a location area associated with the location update processor. The location update retry messages are transmitted at the end of successive retry intervals by the location update processor in the event one of the location update messages is not received by the location database server. The location update messages have time stamps, and the location update retry messages include the time stamps from the unreceived location update message. The location database is for storing location information indicative of the location of the mobile device. The recovery processor is for recovering location information for the mobile device after a failure in the mobile communication network is fixed. In the event that a location update message is received before the retry interval has passed since the failure was fixed, the recovery processor stores in the location database the location information for the mobile device from the location update message. In the event that the retry interval has passed since the failure was fixed without receiving a location update message while receiving at least one location update retry message, the recovery processor stores in the location database the location information for the mobile device from the location update retry message having the most recent time stamp.

In another aspect, a location update processor may include a receiver and a message processor. The location update processor is for use in a mobile communication network having a mobile device and a location database server having a location database storing location information indicative of the location of the mobile device. The receiver receives location update messages from the mobile device when the location of the mobile device changes, and the message processor transmits location update messages to the location database server. In the event one of the location update messages is not received by the location database, the message processor transmits location update retry messages at the end of successive retry intervals until one of the location update retry messages is received.

In another aspect, a method may operate in a distributed database system having n database servers, $D_1, \ldots, D_n$, arranged in a logical ring. The method is a method of updating k of the database servers, $D_{\gamma 1}, \ldots, D_{\gamma k}$, referred to by a placement vector $\Gamma=(\gamma_1, \ldots, \gamma_k)$, where $\gamma_i \in \{1, \ldots, n\}$ is the index of the ith database server updated by the method. The method may include selecting $\gamma_1$ from the set $(1, \ldots, n)$. Also, the method may include for $i=1, \ldots, k-1$, selecting $\gamma_{i+1}$ according to $\gamma_i \oplus \lfloor n/k \rfloor + a_i$, where $\oplus$ is modulo addition defined over the set $(1, 2, \ldots, n)$, displacement vector $\hat{a}=(a_1, \ldots, a_k)$ is a binary vector having a Hamming weight of $\beta$, and $\beta = n - \lfloor n/k \rfloor * k$. The method may further include updating the k database servers, $D_{\gamma 1}, \ldots, D_{\gamma k}$, referred to by the placement vector $\Gamma=(\gamma_1, \ldots, \gamma_k)$ with updated information.

In another aspect, a method may operate in a distributed database system having n database servers, $D_1, \ldots, D_n$, arranged in a logical ring for storing information about a first group of items in k, of the database servers and for storing information about a second group of items in $k_2$ of the database servers, wherein $k_1 > k_2$. The method is a method of querying the database servers for information about a given item. The method may include selecting a first database server $D_1$ and determining in parallel if any of $\lceil n/k \rceil$ successive database servers, $D_i, D_{i+1}, \ldots, D_{i \oplus \lceil n/k1 \rceil}$, contain information about the given item. If at least one of the $\lceil n/k_1 \rceil$ successive database servers, $D_i, \ldots, D_{i \oplus \lceil n/k1 \rceil}$, does not contain information about the given item, the method may determine in parallel if any of the next $(\lceil n/k_1 \rceil - \lceil n/k_2 \rceil)$ successive database servers, $D_{i \oplus \lceil n/k1 \rceil \oplus 1}, \ldots, D_{i \oplus \lceil n/k2 \rceil}$, contain information about the given device. If at least one of the next $(\lceil n/k_2 \rceil - \lceil n/k_1 \rceil)$ successive database servers, $D_{i \oplus \lceil n/k1 \rceil \oplus 1}, \ldots, D_{i \oplus \lceil n/k2 \rceil}$, does not contain information about the given item, then until information for the given item is found or until all the database servers $D_1, \ldots, D_n$, have been checked, the method may determine in parallel if successive groups of $\lceil n/k_2 \rceil$ database servers, $D_{i \oplus (j^* \lceil n/k2 \rceil) \oplus 1}, \ldots, D_{i \oplus (j+1)^* \lceil n/k2 \rceil}$, contain information for the given item, where j represents the jth group of $\lceil n/k_2 \rceil$ database servers that are checked.

In another aspect, a method of updating a database over a network with information from a device may include receiving update messages from the device via a processor connected to the network and transmitting the update messages to the database. In the event one of the update messages is not received by the database, the method may transmit update retry messages at the end of successive retry intervals until one of the update retry messages is received.

One or more of the following advantages may be realized. The fast recovery protocol does not require the use of wireless bandwidth during the recovery process, has a bounded recovery period, and is relatively simple to implement. The fast recovery protocol can be used to recover from both database and link failures, and can be adapted to recover from failures in both global and local location information databases. Moreover, the fast recovery protocol can be used with both centralized and distributed database architectures. When the fast recovery protocol is used with a distributed database architecture, the protocol can be implemented with load-balanced, fault-tolerant update processes and robust, parallel query processes.

Further advantages and features will be apparent from the following description, including the drawings and the claims.

DETAILED DESCRIPTION

Figure 5:
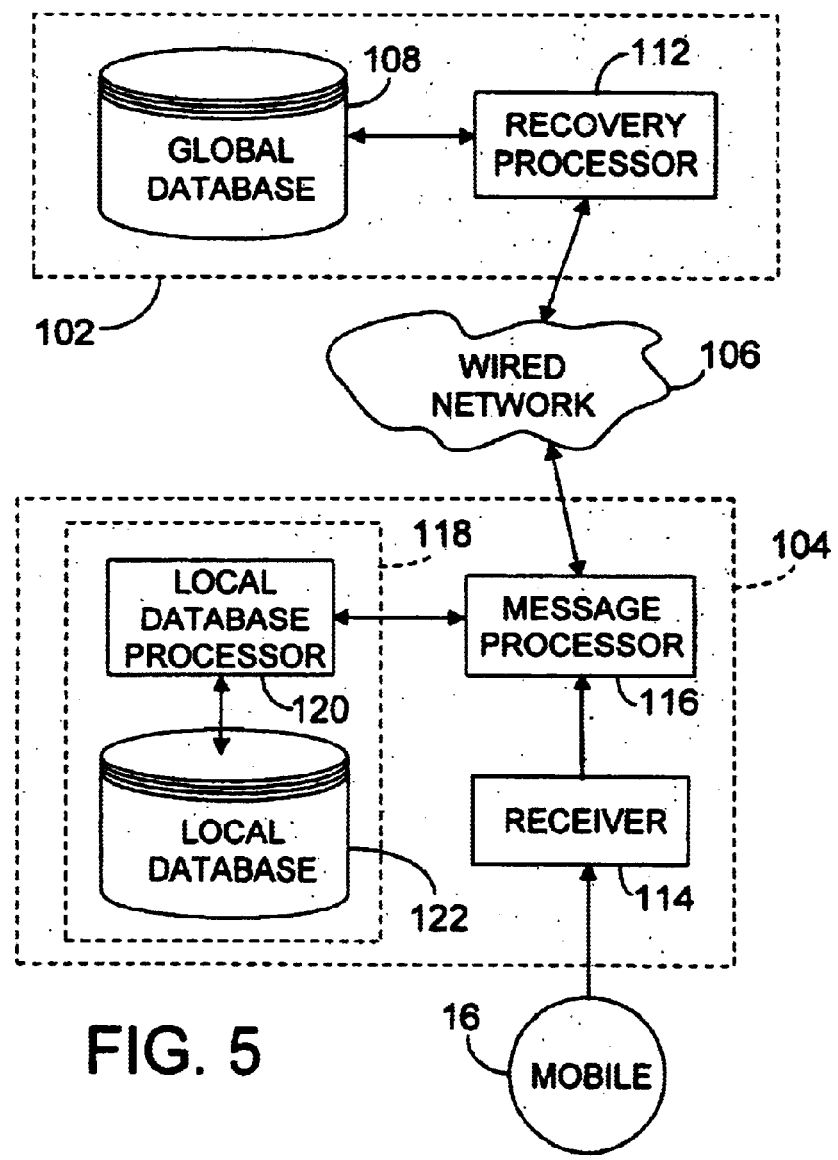
FIG. 5 is a high-level block diagram of a location information recovery and management system.
Figure 3:
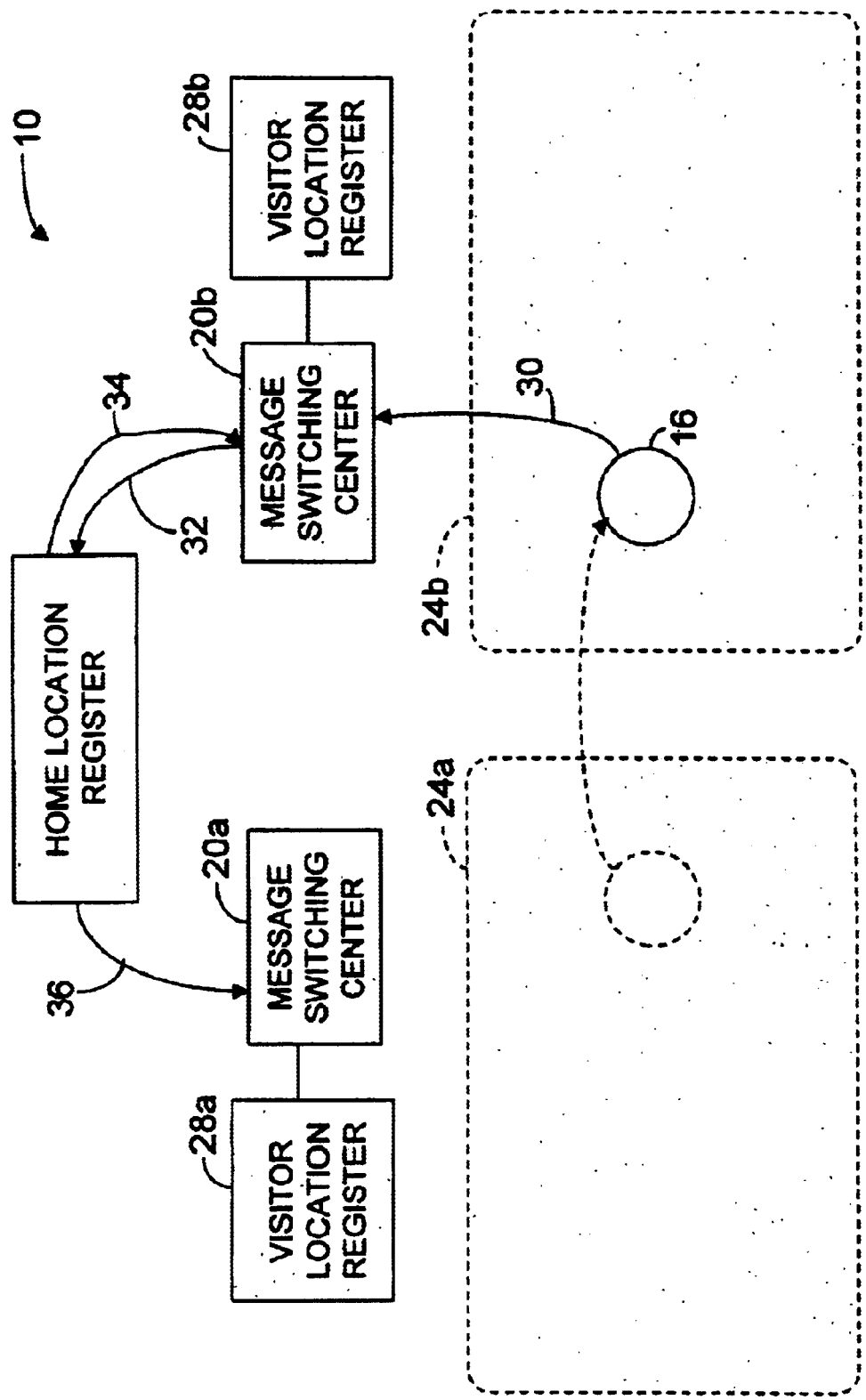
FIG. 3 is a schematic diagram of a conventional method for processing a location update message.

FIG. 5 is a high-level block diagram showing a location information management and recovery system 100. The location information recovery and management system 100 includes a global database server 102 and a plurality of location update processors 104 (only one of which is shown in FIG. 5). The plurality of location update processors 104 are connected to the global database server 102 via a wired network 106.

The global database server 102 includes a global database 108 for storing location and service information about a plurality of mobiles 16 (only one of which is shown in FIG. 5) that is sent to the global database server 102 by the location update processors 104. The global database server 102 also includes a recovery processor 112 for receiving, processing, and sending messages. The recovery processor 112 also is operatively connected to the global database 108 so that, for example, location information about the mobile 16 that is received by the recovery processor 112 from the location update processor 104 can be stored in the global database 108.

The location update processor 104 includes a receiver 114 for receiving messages from the plurality of mobiles 16, a message processor 116 for processing, receiving, and sending messages to and from the mobiles 16 and the global database server 102, and a local database server 118. The local database server 118 includes a local database processor 120 for processing update and query requests from the message processor 116 and a local database 122 for storing location and service information about the mobiles 16 that are registered or otherwise serviced by the location update processor 104.

The location information recovery and management system 100 can be implemented using conventional hardware and software. For example, the global database server 102 and the location update processors 104 can be implemented using commercially available computer workstations having an INTEL PENTIUM class microprocessor running a variant of the UNIX operating system. Preferably, the global database 108 and the local databases 122 are implemented using conventional fail-stop, stable disk storage, e.g., a redundant arrays of disks.

The location information recovery and management system 100 is configured and programmed so as implement a fast recovery protocol (FRP) that allows the system 100 to recover from a database or link failure in a way that does not require the mobiles 16 to send any additional messages.

According to the FRP, when a mobile 16 moves into a different location area, the mobile 16 attempts to update the entry in the global database server 102 for that mobile 16 by sending a location update message (referred to herein as a "mobile update message") to the location update processor 104 associated with the location area that the mobile 16 has just entered. The mobile 16 time stamps the mobile update message. After receiving the mobile update message, the location update processor 104 attempts to send a "location update" message to the global database server 102 that contains information from the mobile update message, including the location information for the mobile 16 and the time stamp. If the location update processor 104 does not receive a message from the global database server 102 acknowledging that the global database server 102 has received the location update message after a predetermined time period (referred to herein as the "predetermined retry interval" or "retry interval") has elapsed since the location update message was sent, the location update processor 104 sends a "location update retry" message, which contains information (including the location information and time stamp) from the location update message. The global database server 102 will not receive the location update message when the global database server 102 is inaccessible because the global database server 102 is not fully operational or because a link connecting the global database server 102 to one or more location update processors 104 is down, i.e., if there is a database or link failure. Subsequently, the location update processor 104 sends location update retry messages after each predetermined retry interval elapses until the location update processor 104 receives a message from the global database server 102 confirming that the global database server 102 has received either the location update message or a location update retry message.

When the global location database server 102 is in a failure period, all incoming calls to a mobile 16 registered in the global database server 102 needing location information from the global database server 102 are lost, i.e., are not completed. If a mobile 16 moves from a first location area to a second location area during the failure period, the location update message that is sent by the location update processor 104 associated with the second location area is not received by the global database server 102. After the failure has been remedied and the global database server 102 is functional and accessible, the global database server 102 will restore the global database 108, if necessary (for example, by restoring the global database 108 from the periodic backups and redundant array of disks). Then the global database server 102 enters a recovery period in which the global database server 102 determines, in accordance with the FRP, whether each of the mobiles 16 registered with the global database server 102 moved to a new location area during the failure period. The global database server 102 makes this determination when the global database server 102 receives a location update message, a call delivery request message, or a location update retry message for that mobile 16 during the recovery period. Generally, after receiving a location update message or a location update retry message for a mobile 16 during the recovery period, the global database server 102 updates the entry for that mobile 16 in the global database 108 to reflect the location information contained in the received message. In this way, the global database server 102 incrementally recovers the global database 108. As will be explained below, with the FRP, the total time for the recovery period is bounded by the length of the predetermined retry interval that is used to determine when to send the location update retry messages.

The global database server 102 sends several types of messages to the location update processors 104 that are registered with the global database server 102 in order to implement the FRP. The global database server 102 broadcasts a "freeze" message to all the location database processors 104 registered with the global database server 102 when the global database server 102 initiates the recovery process after the database or link failure has been fixed. When each location update processor 104 receives the freeze message from the global database server 102, the location update processor 104 freezes the entries in the local database 122 associated with the location update processor 104 for all mobiles 16 that are registered with the global database server 102. A frozen entry in the local database 122 cannot be used until the global database server 102 validates the entry in the global database 108. Therefore, the freeze message prevents the location update processors 104 from routing calls to non-existent mobiles in the location areas associated with the location update processors 104. Thus, for each mobile 16 that is registered with the global database server 102, all incoming calls to that mobile 16 are dropped (that is, are not completed) during the recovery period until the global database server 102 validates the entries in the global database 108 for that mobile 16.

The global database server 102 can broadcast an "unfreeze" message to all the location update processors 104 registered with the global database server 102 when the global database server 102 has completed the recovery process. When each location update processor 104 receives the unfreeze message from the global database server 102, the location update processor 104 unfreezes the entries in the local database 122 for all mobiles 16 that are registered with the global database server 102 and location update processor 104. After being unfrozen, the entries can be used for completing calls.

The global database server 102 sends a "delete" message to a location update processor 104 when the global database server 102 determines that a particular mobile 16 does not reside in the location area that is associated with the location update processor 104. When the location update processor 104 receives the delete message, the location update processor 104 removes the entry located in the local database 122 for that mobile 16 and ceases sending location update retry messages for that mobile 16, if the location update processor 104 was sending location update retry messages for that mobile 16.

The global database server 102 sends an "update" message to a location update processor 104 when the global database server 102 determines that a particular mobile 16 resides in the location area associated with that location update processor 104. When the location update processor 104 receives the update message from the global database server 102, the location update processor 104 adds an entry to the local database 122 for that mobile 16, if one does not already exist in the local database 122; otherwise, if an entry exists in the local database 122 (for example, if the mobile 16 moved out of the location area associated with the location update processor 104 during the failure period and then returned to that same location area during the same recovery period), the entry is unfrozen and updated with the current information about the mobile 16. The global database server 102 also preferably sends the update message to the location update processor 104 to confirm the receipt of a location update message.

When the global database server 102 receives a location update retry message during the recovery period, the global database server 102 sends an "update freeze" message to the location update processor 104 that sent the location update retry message. The global database server 102 cannot immediately conclude that the mobile 16 associated with the received location update retry message is located within the location area associated with the location update processor 104 that sent the location update retry message because the mobile 16 may have moved into more than one location area during the failure period and may no longer reside in the location area associated with the location update processor 104 that sent the location update retry message. When the location update processor 104 that sent the location update retry message receives the update freeze message, an entry for that mobile 16 is added to the local database 122 associated with the location update processor 104 if an entry for that mobile 16 one does not already exist; otherwise, the existing entry is updated with the current information about that mobile 16. In addition, the location update processor 104 freezes the entry. Also, the location update processor 104 no longer resends the received location update retry message after receiving the update freeze message from the global database server 102.

For each mobile 16 that is registered with the global database server 102, the operation of the FRP in the recovery period is characterized by three general cases. In the first case, a location update message or a call delivery request is received by the global database server 102 during the recovery period. When the global database server 102 receives a location update message or a call delivery request from a location update processor 104 during the recovery period, the global database server 102 knows that the mobile 16 is in the location area indicated by the location update message or the call delivery request. A delete message is sent to the location update processor 104 indicated by the existing entry for the mobile 16, and then the entry in the global database 108 is updated with the location information contained in the received message. The global database server 102 sends an update message to the location update processor 104 that sent the received location update message or call delivery request. The global database server 104 also sends a delete message to each location update processor 104 that sent a location update retry message to the global database server 102 during the recovery period other than the location update processor 104 that sent the received location update message or call delivery request. Therefore, the recovery period for that mobile 16 ends when the location update message or call delivery request is received by the global database server 102, and thereafter the global database server 102 sends delete messages to any location update processors 104 from which the global database server 102 receives location update retry messages.

Figure 6:
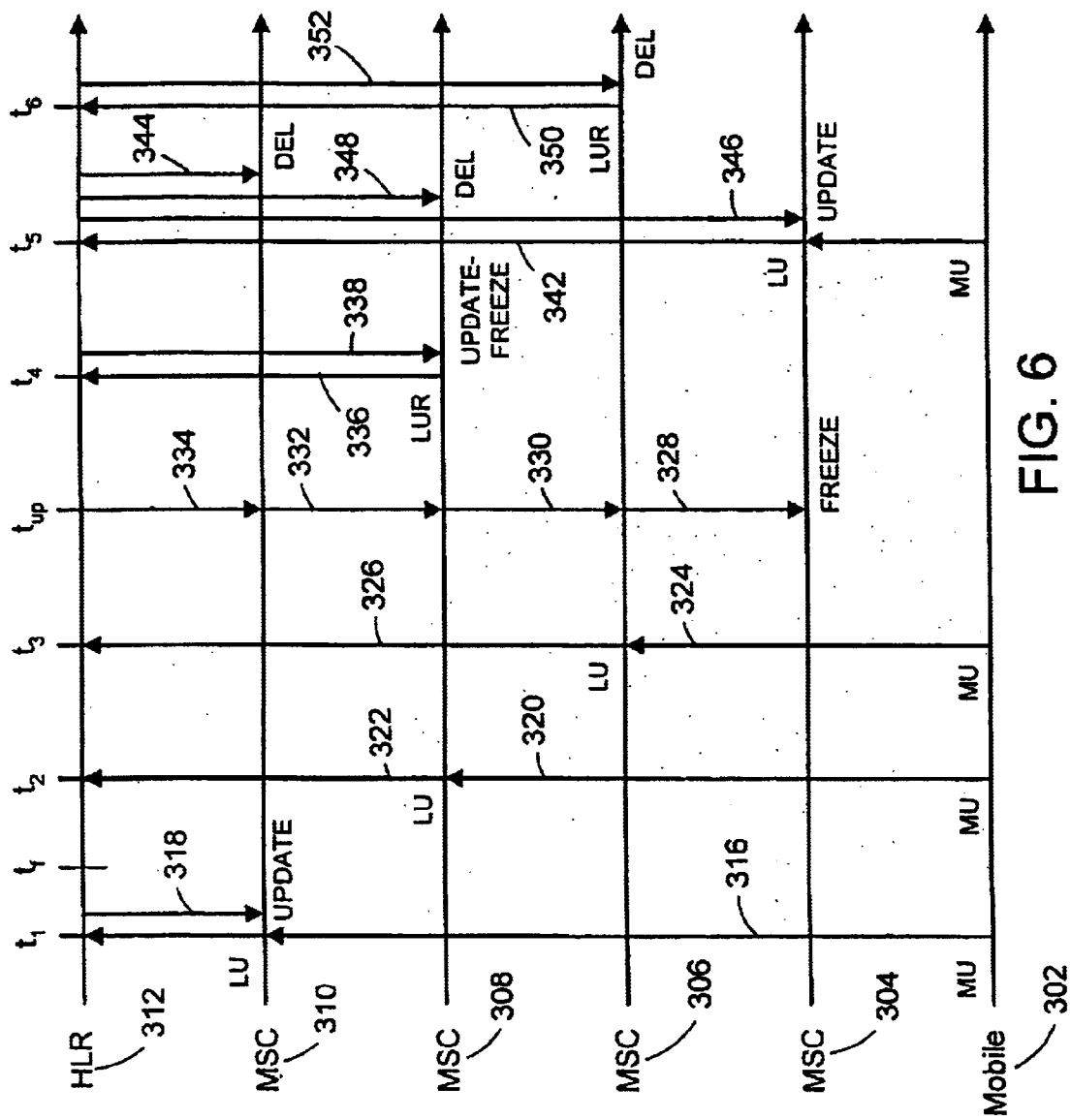
FIG. 6 is a timing diagram of the messages generated by the system of FIG. 5 when a location update message is received by the global database server during the recovery period.

An example showing the timing of the various events in the first case is shown in FIG. 6. Mobile 302, location update processors 304, 306, 308, and 310, and global database server 312 are shown in FIG. 6. At time $t_1$, the mobile 302 enters the location area associated with location update processor 310 and sends a mobile update message 314 to the location update processor 310. The location update processor 310 receives the mobile update message 314 and then sends a location update message 316 to the global database server 312. The global database server 312 receives the location update message 316, updates the entry in the global database associated with the global database server 312, and sends an update message 318 to the location update processor 310.

At time $t_f$, a database or link failure causes the global database server 312 to be inaccessible, which causes the global database server 312 to enter a failure period. At time $t_2$, the mobile 302 moves into the location area associated with location update processor 308 and sends location update processor 308 a mobile update message 320. The location update processor 308 receives the mobile update message 320 and sends a location update message 322 to the global database server 312. However, because the global database server 312 is in a failure period and is inaccessible, the global database server 312 does not receive the location update message 322.

At time $t_3$, the mobile 302 moves into the location area associated with location update processor 306 and sends a mobile update message 324 to the location update processor 306. The location update processor 306 receives the mobile update message 324 and sends a location update message 326 to the global database server 312. Again, because the global database server 312 is in a failure period, the global database server 312 does not receive the location update message 326.

At time $t_{up}$, the failure is fixed and the global database server 312 becomes accessible again, which marks the end of the failure period and the beginning of the recovery period. The global database server 312 broadcasts freeze messages 328, 330, 332, and 334 to location update processors 304, 306, 308, and 310, respectively. Upon receiving the freeze messages 328, 330, 332, and 334, the location update processors 304, 306, 308, and 310, respectively, freeze the entries (if one exists) in the local databases associated with the location update processors 304, 306, 308, and 310 for the mobile 302.

At time $t_4$, which is when the predetermined retry period s has elapsed since the location update message 322 was sent by the location update processor 308, the location update processor 308 sends a location update retry message 336 (which contains the location information and time stamp from the location update message 322) to the global database server 312. As can be seen from FIG. 6, when the global database server 312 receives the location update retry message 336, the location information from the location update retry message 336 does not correspond to the location area where the mobile 302 is located. In other words, the mobile 302 is located in location area associated with location update processor 306, while the location information contained in the location update retry message 336 refers to the location area associated with location update processor 308. After receiving the location update retry message 336, the global database server 312 sends an update freeze message 338 to the location update processor 308. Upon receiving the update freeze message 338, the location update processor 308 adds an entry to the local database associated with location update processor 308 for the mobile 302, if one does not already exist, (otherwise, the existing entry is updated with the current information) and freezes the entry.

At time $t_5$, the mobile 302 moves into the location area associated with the location update processor 304 and sends a mobile update message 340 to location update processor 304. Upon receiving the mobile update message 340, the location update processor 304 sends a corresponding location update message 342 to the global database server 312. When the global database server 312 receives the location update message 342, the global database server 312 knows that the mobile 302 is in the location area associated with the location update processor 304. Therefore, the global database server 312 sends a delete message 344 to the location update processor 310, which is the location update processor indicated by the existing entry in the global database for the mobile 302, and then the entry is updated with the location information contained in the location update message 342.

The global database server 312 then sends an update message 346 to the location update processor 304. The global database server 312 also sends a delete message 348 to the location update processor 308 because the global database server 312 received the location update retry message 336 from the location update processor 308 during the recovery period. Because the global database server 312 knows that the mobile 302 is located in the location area associated with the location update processor 304, the recovery period for the mobile 302 ends at $t_5$.

At time $t_6$, which is when the predetermined retry period s has elapsed since the location update message 326 was sent by the location update processor 306, a location update retry message 350 is sent by the location update processor 306 to the global database server 312. Since the global database server 312 has received the location update message 342 for the mobile 302, the global database server 312 sends the location update processor 306 a delete message 352.

In the second case that characterizes the operation of the FRP, a location update message or call delivery request is not received by the global database server 102 during the recovery period and at least one location update retry message is received by the global database server 102 during the recovery period. Unlike when the global database server 102 receives a location update message or a call delivery request during the recovery period (as shown in FIG. 6), when the global database server 102 does not receive a location update retry message or a call delivery request during the recovery period, the global database server 102 cannot be certain that the mobile 16 is in the location area indicated by any location update retry message that the global database server 102 receives because the mobile 16 may have moved into more than one location area during the failure period and may no longer reside in the location area associated with the location update processor 104 that sent the received location update retry message. When the predetermined retry interval has elapsed since the global database server 102 initiated the recovery period, the global database server 102 knows that at least one location update retry message for the mobile 16 has been received from each location update processor 104 that sent a location update message for that mobile 16 during the failure period. The global database server 102 knows this because location update retry messages are sent once every predetermined retry interval, so any location update processor 104 that sent a location update message for the mobile 16 during the failure period will send a location update retry message corresponding to the location update message sent during the failure period once during the period that starts when the global database server 102 initiates the recovery period and ends after the predetermined retry interval has elapsed since the start of the recovery period. The global database server 102 determines the predetermined retry interval for each mobile 16 registered with the global database server 102 from the information that is stored in the global database 108 for each mobile 16.

After the predetermined retry interval has elapsed since the start of the recovery period, the global database server 102 determines which of the location update retry messages received by the global database server 102 during the recovery period has the most recent time stamp (sometimes referred to herein as the "most recent" location update retry message). The mobile 16 is located in the location area associated with the location update processor 104 that sent the location update retry message with the most recent time stamp. A delete message is sent to the location update processor 104 indicated by the existing entry for the mobile 16 in the global database 108, and then the entry is updated with the location information contained in the location update retry message with the most recent time stamp. The global database server 102 also sends an update message to the location update processor 104 that sent the most recent location update retry message. The global database server 102 also sends delete messages to each location update processor 104 that sent a location update retry message to the global database server 102 during the recovery period other than the location update processor 104 that sent the most recent location update retry message. Therefore, the recovery period for that mobile 16 ends when the predetermined retry interval has elapsed since the recovery period began.

Figure 7:
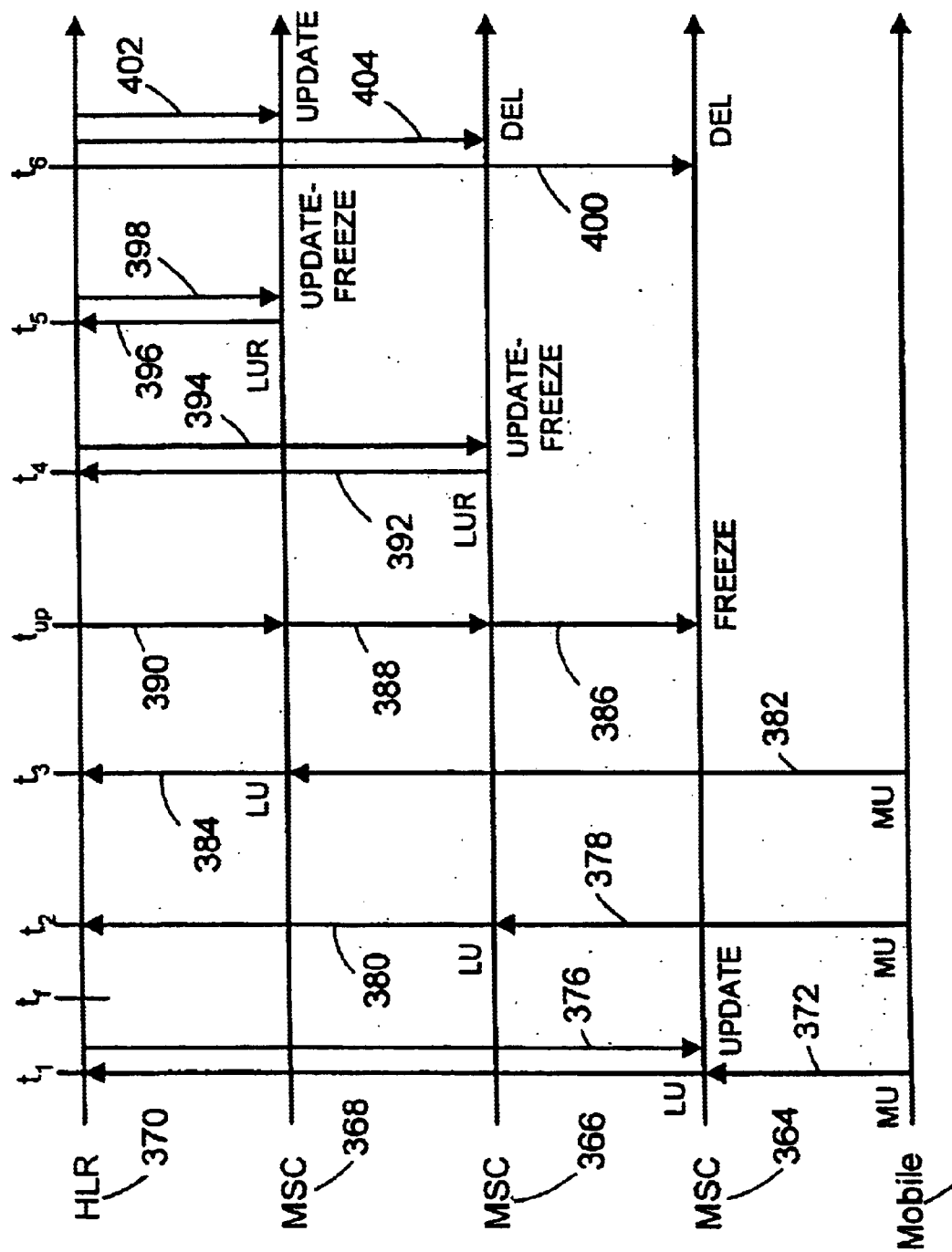
FIG. 7 is a timing diagram of the messages generated by the system of FIG. 5 when a location update message is not received by the global database server during the recovery period.

An example showing the timing of the various events in the second case is shown in FIG. 7. Mobile 362, location update processors 364, 366, and 368 and global database server 370 are shown in FIG. 7. At time $t_1$, the mobile 362 enters the location area associated with location update processor 364 and sends a mobile update message 372 to the location update processor 364. The location update processor 364 receives the mobile update message 314 and then sends a location update message 374 to the global database server 370. The global database server 370 receives the location update message 374, updates the entry in the global database server's global database, and sends an update message 376 to the location update processor 364.

At time $t_f$, a database or link failure causes the global database server 370 to be inaccessible, which marks the beginning of a failure period. At time $t_2$, the mobile 362 moves into the location area associated with location update processor 366 and sends location update processor 366 a mobile update message 378. The location update processor 366 receives the mobile update message 378, and sends a location update message 380 to the global database server 370. However, because the global database server 370 is in a failure period and is inaccessible, the global database server 370 does not receive the location update message 380.

At time $t_3$, the mobile 362 moves into the location area associated with location update processor 368 and sends a mobile update message 382 to the location update processor 368. The location update processor 368 receives the mobile update message 382 and sends a location update message 384 to the global database server 370. Again, because the global database server 370 is in a failure period, the global database server 370 does not receive the location update message 384.

At time $t_{up}$, the failure is fixed and the global database server 370 becomes accessible again, which marks the beginning of the recovery period. The global database server 370 broadcasts freeze messages 386, 388, and 390 to location update processors 364, 366, and 368, respectively. Upon receiving the freeze messages 386, 388, and 390, the location update processors 364, 366, and 388, respectively, freeze the entries for mobile 362 (if they exist) in their local databases.

At time $t_4$, which is when the predetermined retry period s has elapsed since the location update message 380 was sent by the location update processor 366, the location update processor 366 sends a location update retry message 392 (which contains the location information and time stamp from the location update message 380) to the global database server 370. As can be seen from FIG. 7, when the global database server 370 receives the location update retry message 392, the location information from the location update retry message 392 does not correspond to the location area where the mobile 362 is located. In other words, the mobile 302 is located in location area associated with location update processor 368, while the location information contained in the location update retry message 392 refers to the location area associated with location update processor 366. After receiving the location update retry message 392, the global database server 370 sends an update freeze message 394 to the location update processor 366. Upon receiving the update freeze message 394, the location update processor 366 adds an entry to the local database associated with location update processor 366 for the mobile 362, if one does not already exist, (otherwise, the existing entry is updated with the current information) and freezes the entry.

At time $t_5$, which is when the predetermined retry period s has elapsed since the location update message 384 was sent by the location update processor 368, the location update processor 368 sends a location update retry message 396 (which contains the location information and time stamp from the location update message 384) to the global database server 370. Although the location information contained in location update retry message 396 does indeed correspond to the location area where the mobile 362 is located, the global database server 370, at $t_5$, cannot make this determination based solely on the location update retry message 396 since the mobile 362 may have left the location area associated with the location update processor 368 (although that is not the case in the example shown in FIG. 7). After receiving the location update retry message 396, the global database server 370 sends an update freeze message 398 to the location update processor 368. Upon receiving the update freeze message 398, the location update processor 368 adds an entry to the local database associated with location update processor 368 for the mobile 362, if one does not already exist, (otherwise, the existing entry is updated with the current information) and freezes the entry.

At time $t_6$, which is when the predetermined retry period s has elapsed since the global database server 370 began the recovery period (that is, since $t_{up}$) the global database server 370 determines that the location update retry message 396 has the most recent time stamp and therefore determines that the mobile 362 is located in the location area associated with the location update processor 368, which is the location update processor that sent the location update retry message 396. Thus, the recovery period ends at $t_6$. A delete message 400 is sent to the location update processor 364, which is the location update processor indicated by the existing entry in the global database server's global database for the mobile 362, and then the entry is updated with the location information contained in the location update retry message 396. The global database server 370 sends an update message 402 to the location update processor 368 and sends a delete message 404 to the location update processor 366.

In the third case that characterizes the operation of the FRP, the global database server 102 does not receive a location update message, call delivery request, or location update retry message during the recovery period. When the predetermined retry interval has elapsed since the global database server 102 initiated the recovery period and no location update message, call delivery request, or location update retry message has been received by the global database server 102 since the start of the recovery period, the global database server 102 knows that the mobile 16 has not moved during the failure period because, if the mobile 16 had moved during the failure period, the global database server 102 would have received a location update retry message for the mobile 16. As a result, the global database server 102 knows that the entry for the mobile 16 in the global database server's global database is correct and broadcasts an unfreeze message to the location update processors 104 registered with the global database server 102. Therefore, the recovery period ends for the mobile 16 after the predetermined retry interval has elapsed since the start of the recovery period.

Therefore, the recovery period for each mobile 16 ends either when a location update message or call delivery request is received by the global database server 102 or after the predetermined retry interval s has elapsed since the beginning of the recovery period, whichever occurs first. As a result, the recovery period using the FRP is bounded by the predetermined retry interval s. Preferably the predetermined retry interval s is fixed based on network statistics for call arrivals and departures and mobility rates. However, if the latency of the wired network 106 is significant relative to the predetermined retry interval s, the latency of the wired network 106 must be taken into account and the recovery period does not end in the second and third cases until an amount of time equal to the predetermined retry interval s plus the latency of the wired network 106 has passed since the database or link failure was removed. As a result, the recovery period of the FRP when the latency of the wired network is significant relative to the predetermined retry interval is bounded by the predetermined retry interval s plus the latency of the network.

Figure 1:
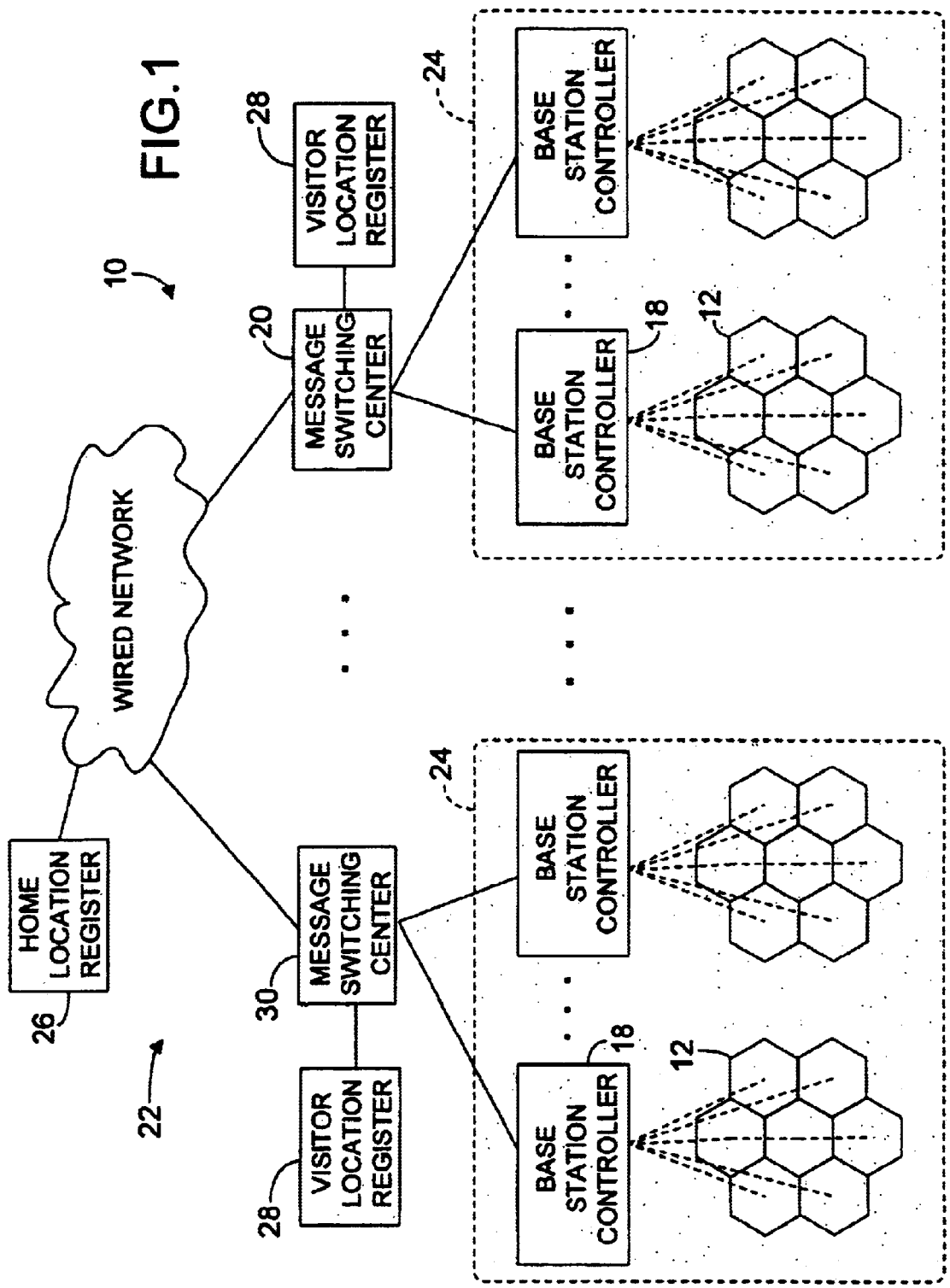
FIG. 1 is a block diagram of a mobile communication network with which a location information recovery and management system can be implemented.
Figure 2:
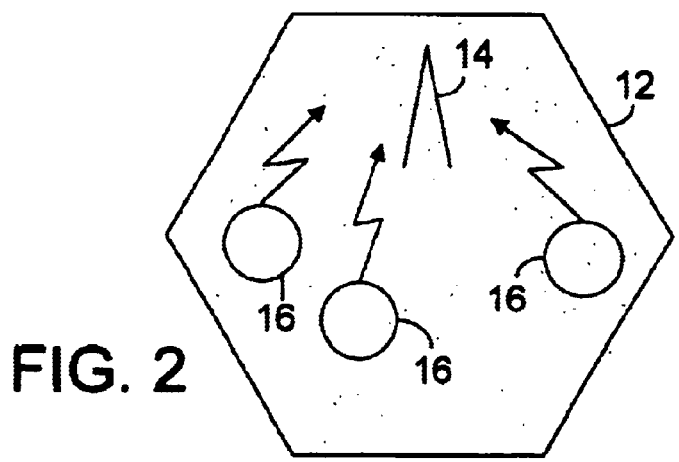
FIG. 2 is a detailed block diagram of a cell as shown in FIG. 1.
Figure 8:
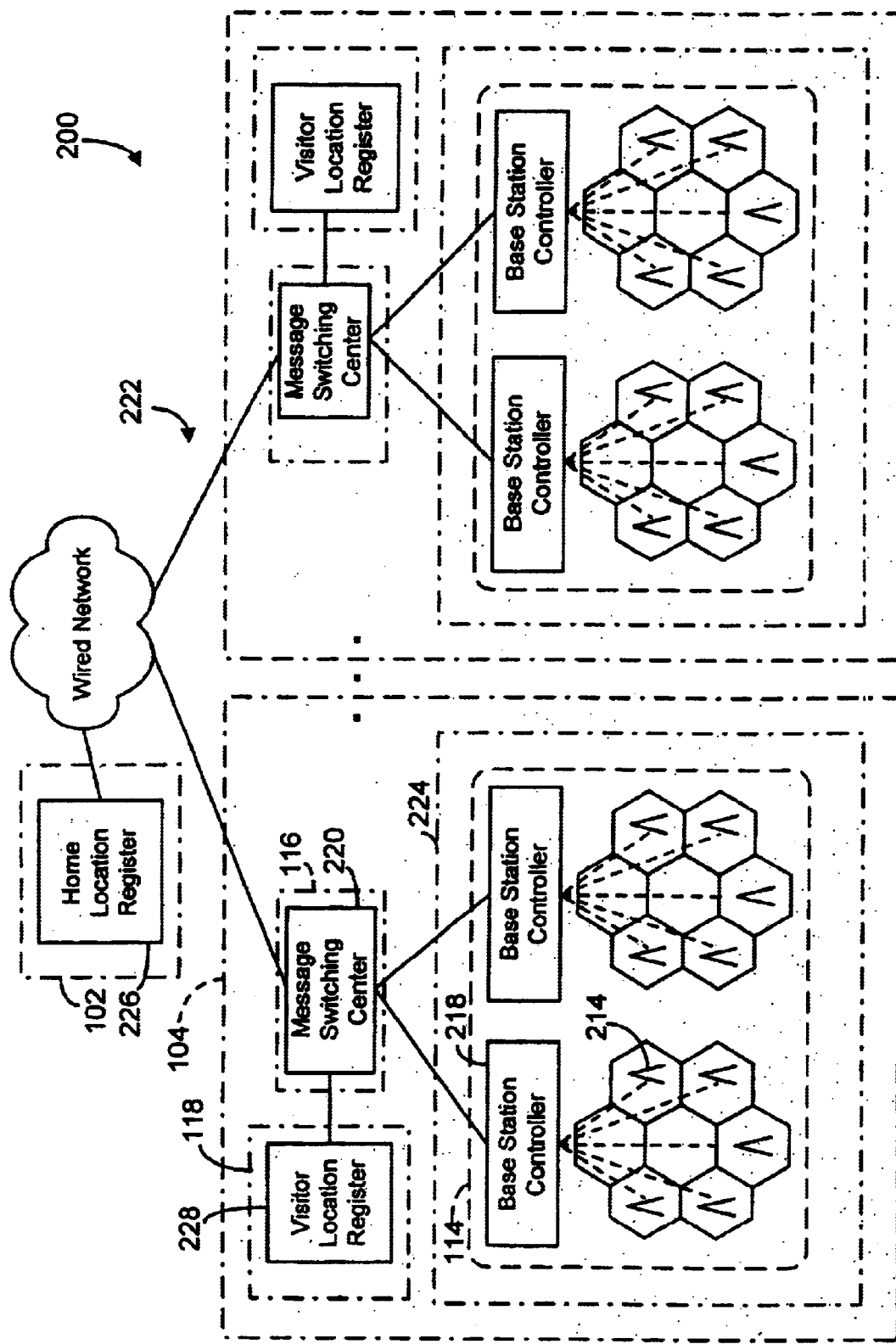
FIG. 8 is block diagram of one embodiment of a location information recovery and management system.

Location information recovery and management system 200, an embodiment of the location information recovery and management system 100, is shown in FIG. 8 implemented in a mobile communication network of the type shown in FIGS. 1–2. In the embodiment shown in FIG. 8, the global database server 102 includes a home location register 226 similar to the HLR 26 shown in FIG. 1. Also, one location update processor 104 is provided for each location area 224 so that the mobiles 16 in each location area 224 communicate with the location update processor 104 via the receiver 114. Moreover, in the embodiment shown in FIG. 8, the receiver 114 of each location update processor 104 includes base stations 214 similar to the base stations 14 shown in FIG. 2 and base station controllers 218 similar to the base station controllers 18 shown in FIG. 1. In addition, each message processor 116 includes a message switching center 220 similar to the message switching center 20 shown in FIG. 1, and each local location database server 118 includes a visitor location register 228 similar to the VLRs 28 shown in FIG. 1. The global database server 102 and the plurality of location update processors 104 communicate with one another via wired network 222. The components of the mobile communication network 210 are configured and programmed to operate in a conventional manner (for example, in compliance with IS-41 and GSM standards) except as described below.

Figure 9:
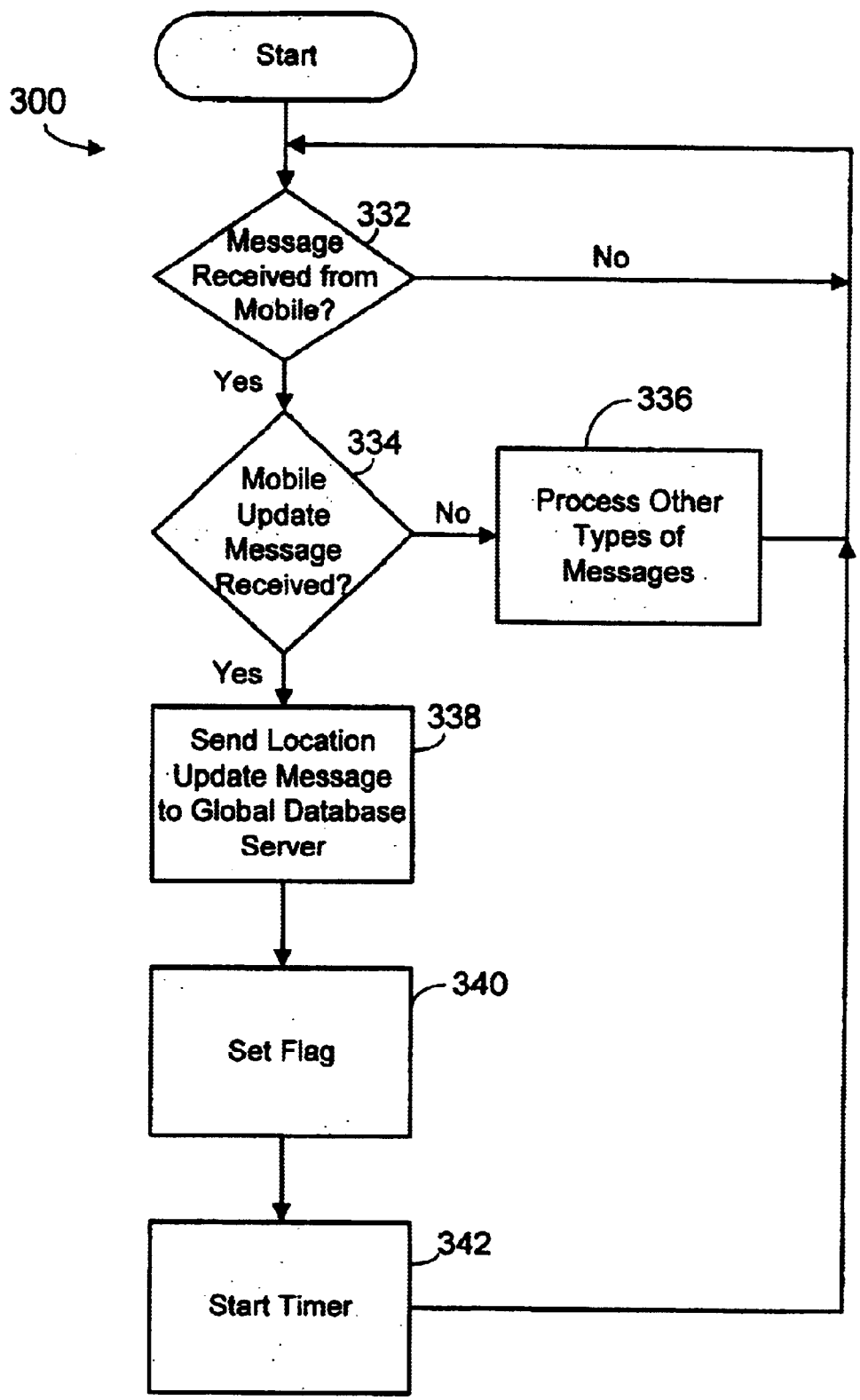
FIG. 9 is a flow diagram of a first function performed by the location update processor of FIG. 5.

The location information recovery and management system 200 shown in FIG. 8 is configured and programmed to implement the FRP. In particular, each message switching center 220 is configured and programmed to execute a process 330, shown in FIG. 9, when a message is received from a mobile 16 that is registered with or otherwise serviced by the message switching center 220. At step 332, the message switching center 220 waits until a message is received from a mobile 16 that is registered or otherwise serviced by the message switching center 220. A message that is sent by a mobile is initially received by a base station 214 and is forwarded to the base station controller associated 218 with the base station 214 that received the message. The base station controller 218 then forwards the message on to the base station controller's message switching center 220.

Figure 4:
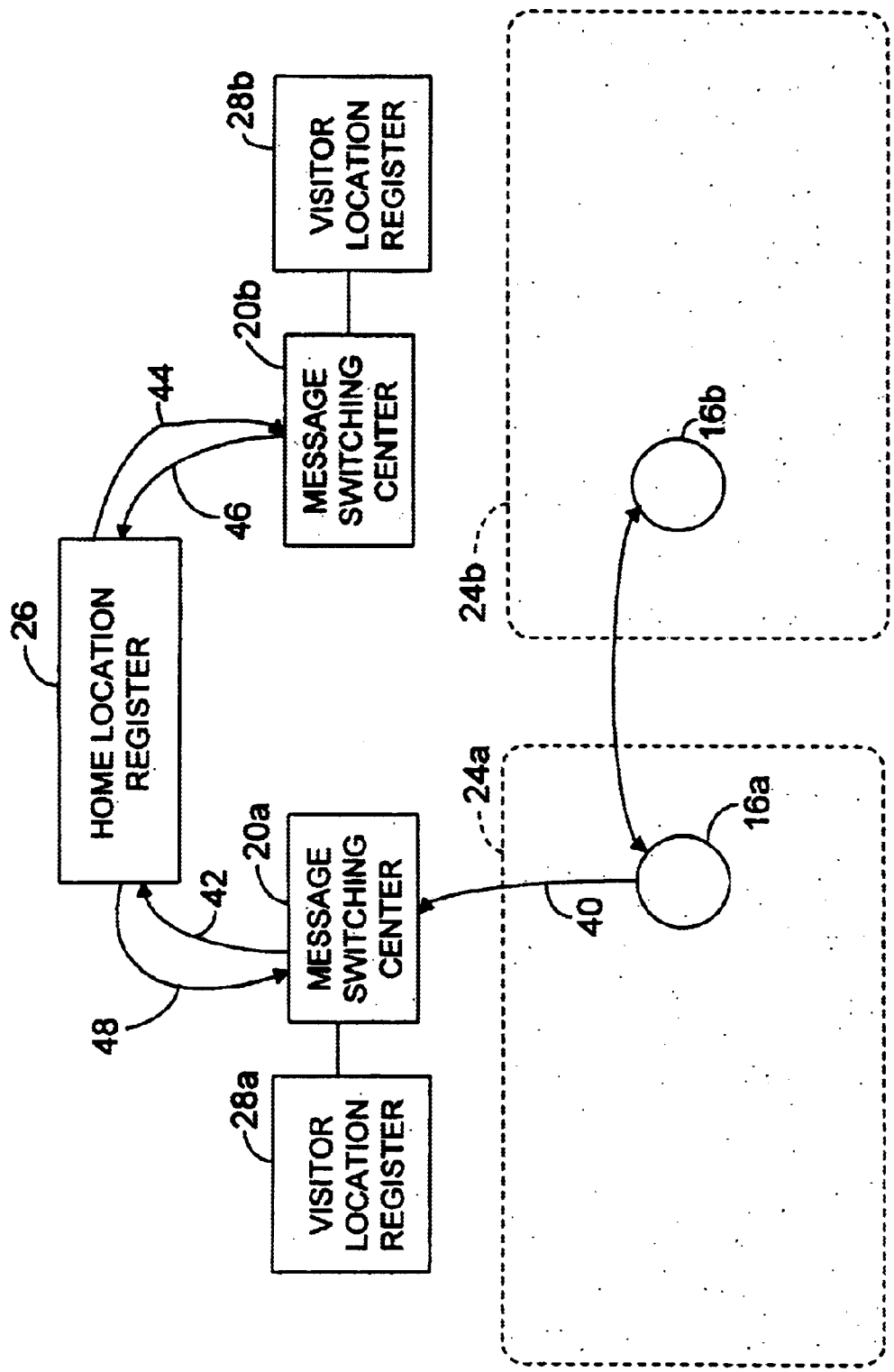
FIG. 4 is schematic diagram of a conventional method for processing a call delivery request.

When a message is received from a mobile 16 by the message switching center 220, the message switching center 220 determines if the received message is a mobile update message at step 334. If the received message is not a mobile update message, the received message is processed, at step 336, in a conventional manner. For example, if the message is a CDR message, the received message is processed as described above in connection with FIG. 4. If the received message is a mobile update message, then at step 338 a location update message is sent from the message switching center 220 to the HLR 226. Then, at step 340 a flag associated with the particular mobile 16 that sent the mobile update message is set in order to indicate that a location update message has been sent to the HLR 226 but a message from the HLR 226 confirming that the HLR 226 has received the location update message has not yet been received by the message switching center 220. Also, at step 342 a timer associated with the particular mobile 16 that sent the mobile update message is started. The timer keeps track of the amount of time that has elapsed since the location update message was sent to the HLR 226. Then the process 330 loops back to the top of the process to wait for other messages from mobiles 16.

Figure 10:
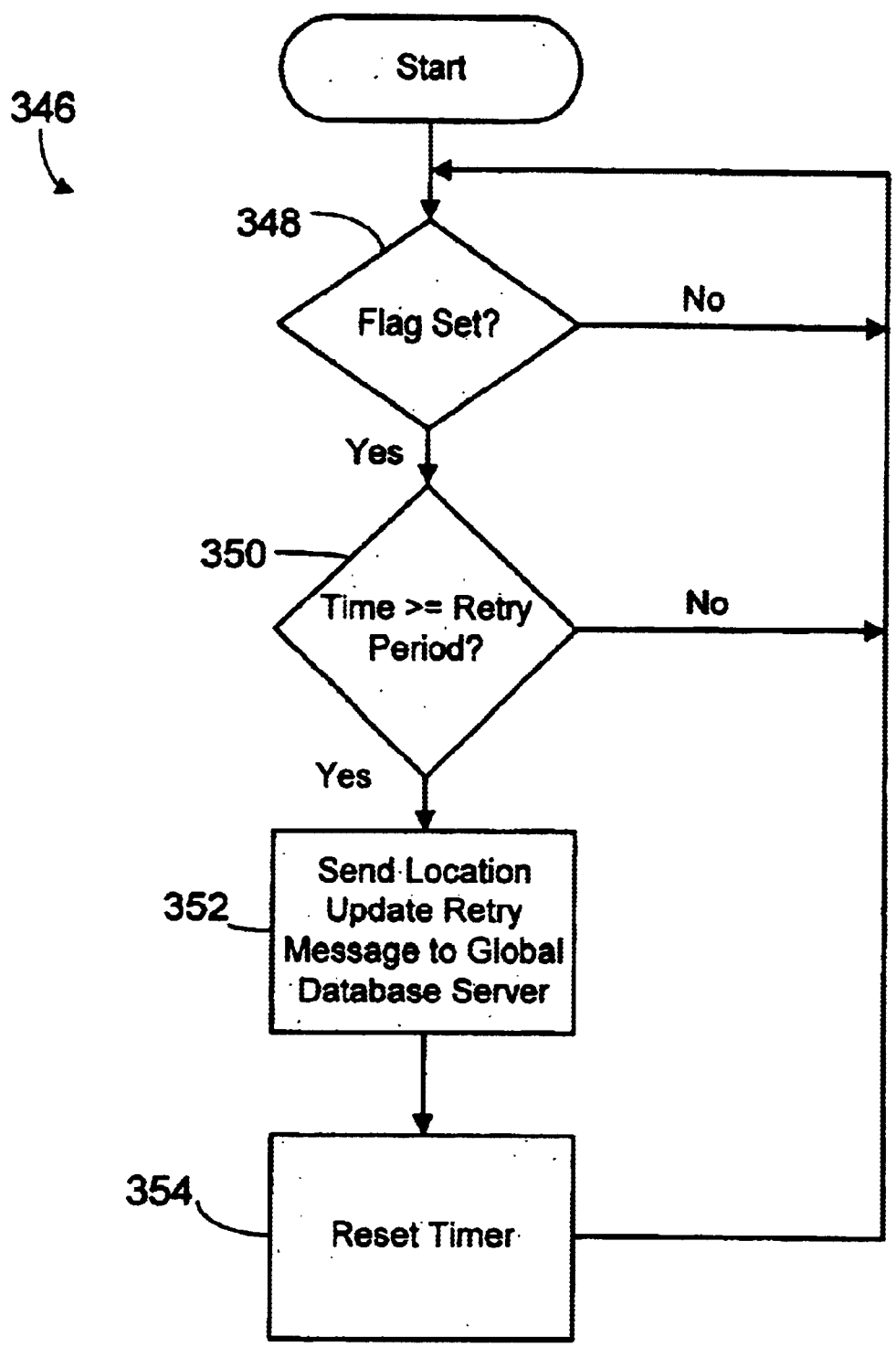
FIG. 10 is a flow diagram of a second function performed by the location update processor of FIG. 5.

Each message switching center 220 is also configured and programmed to execute a process 346, shown in FIG. 10, to determine whether the message switching center 220 should send a location update retry message to the HLR 226. The message switching center 220 continuously checks to see if any of the flags have been set, in step 348. If a flag for a particular mobile 16 has been set (which means that a location update message has been sent to the HLR 226 but confirmation that the HLR 226 has received the location update message has not yet been received), the timer associated with the set flag is checked to see if the amount of time that has elapsed since the last location update message or location update retry message for that mobile 16 was sent is greater than or equal to a predetermined retry interval in step 350. If the amount of time that has elapsed is less than the predetermined retry interval, then the process 346 loops back to step 348. If the amount of time that has elapsed is greater than or equal to the predetermined retry interval, then at step 352 a location update retry message is sent to the HLR 226 and at step 354 the timer is restarted. Then the process 346 loops back to rexecute the process 346.

Figure 11:
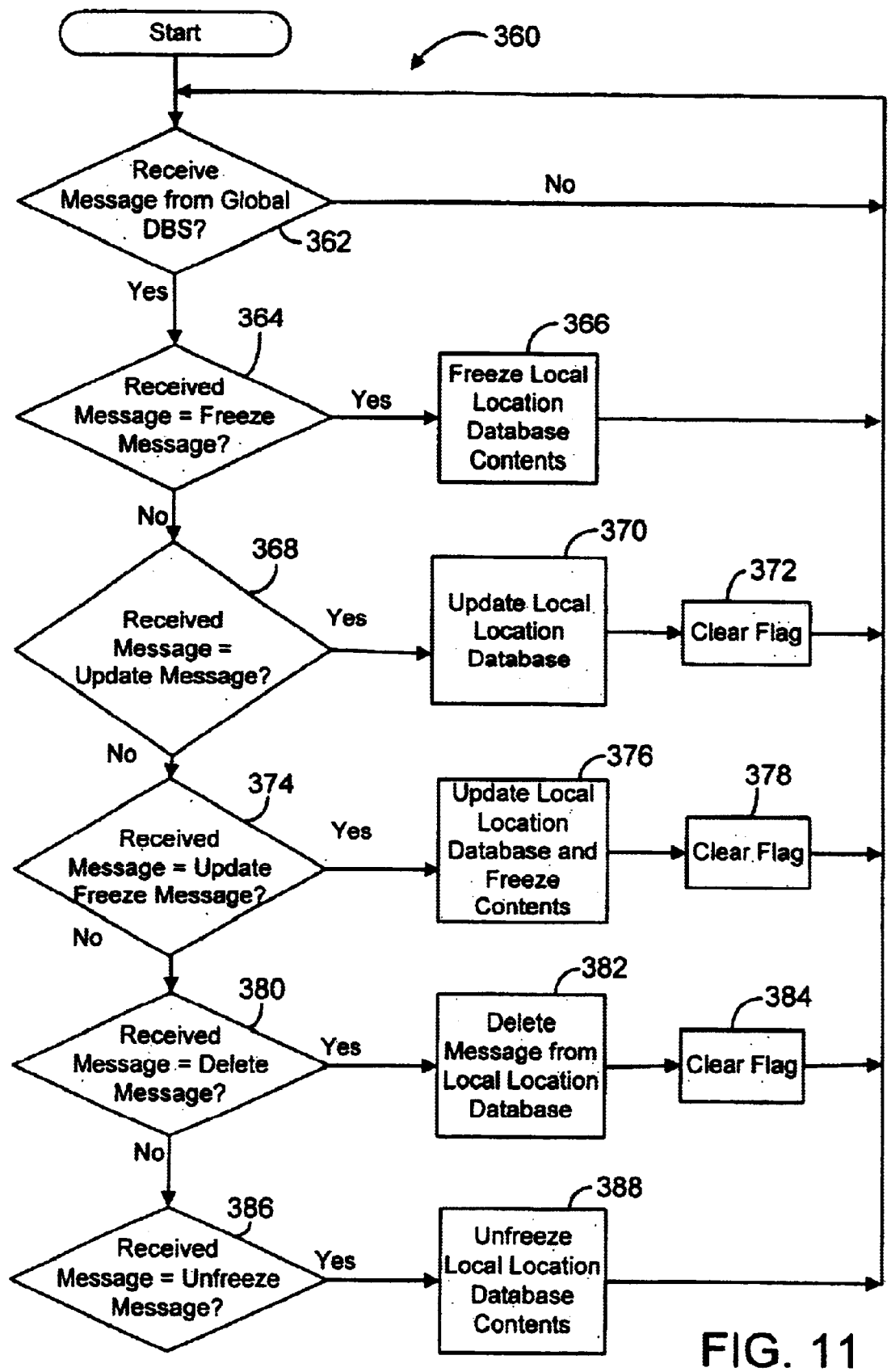
FIG. 11 is a flow diagram of a third function performed by the location update processor of FIG. 5.

In addition, each message switching center 220 is configured and programmed to execute a process 360, shown in FIG. 11, for processing the messages sent to the message switching center 220 by the HLR 226. The message switching center 220 continuously checks to see if a message has been received by the message switching center 220 at step 362. If a message has been received from the HLR 226 and the received message is a freeze message (which is determined at step 364), then the message switching center 220, at step 366, freezes the entries in the VLR 228 associated with the message switching center 220 for all mobiles 16 that are registered with the HLR 226. Then the process 360 loops back to step 362 to wait for the next message from the HLR 226.

If the received message is an update message (which is determined at step 368), then the message switching center 220, at step 370, adds an entry to the VLR 228 for the mobile 16, if one does not already exist in the VLR 228; otherwise, if an entry exists in the VLR 228 for the mobile 16 (for example, if the mobile 16 moved out of the location area 224 associated with the message switching center 220 during the failure period and then returned to that same location area 224 during the same recovery period), the entry is unfrozen and updated with the current information about the mobile 16. Also, at step 372, the flag associated with the mobile 16 is cleared so that the message switching center 220 does not send location update retry messages to the HLR 226 for that mobile 16 during the current recovery period. Then the process 360 loops back to step 362 to wait for the next message from the HLR 226.

If the received message is an update freeze message (which is determined at step 374), then the message switching center 220, at step 376, adds an entry to the VLR 228 for the mobile 16, if one does not already exist; otherwise, the message switching center 220 updates the entry with the current information about the mobile 16. In addition, the message switching center 220 freezes the entry (or keeps the entry in a frozen state if the entry already existed in the VLR 228). Also, at step 378, the flag associated with the mobile 16 is cleared so that the message switching center 220 does not send location update retry messages to the HLR 226 for that mobile 16 during the current recovery period. Then the process 360 loops back to step 362 to wait for the next message from the HLR 226.

If the received message is a delete message (which is determined at step 380), then the message switching center 220, at step 382, removes the entry located in the VLR 228 for that mobile 16, and, at step 384, the flag associated with the mobile 16 is cleared (if it was set) so that the message switching center 220 does not send location update retry messages to the HLR 226 for that mobile 16 during the current recovery period. Then the process 360 loops back to step 362 to wait for the next message from the HLR 226.

If the received message is an unfreeze message (which is determined at step 386), then the message switching center 220, at step 388, unfreezes the entries in the VLR 228 for all mobiles 16 that are registered with the HLR 226 and the VLR 228. Then the process 360 loops back to step 362 to wait for the next message from the HLR 226.

Figure 12:
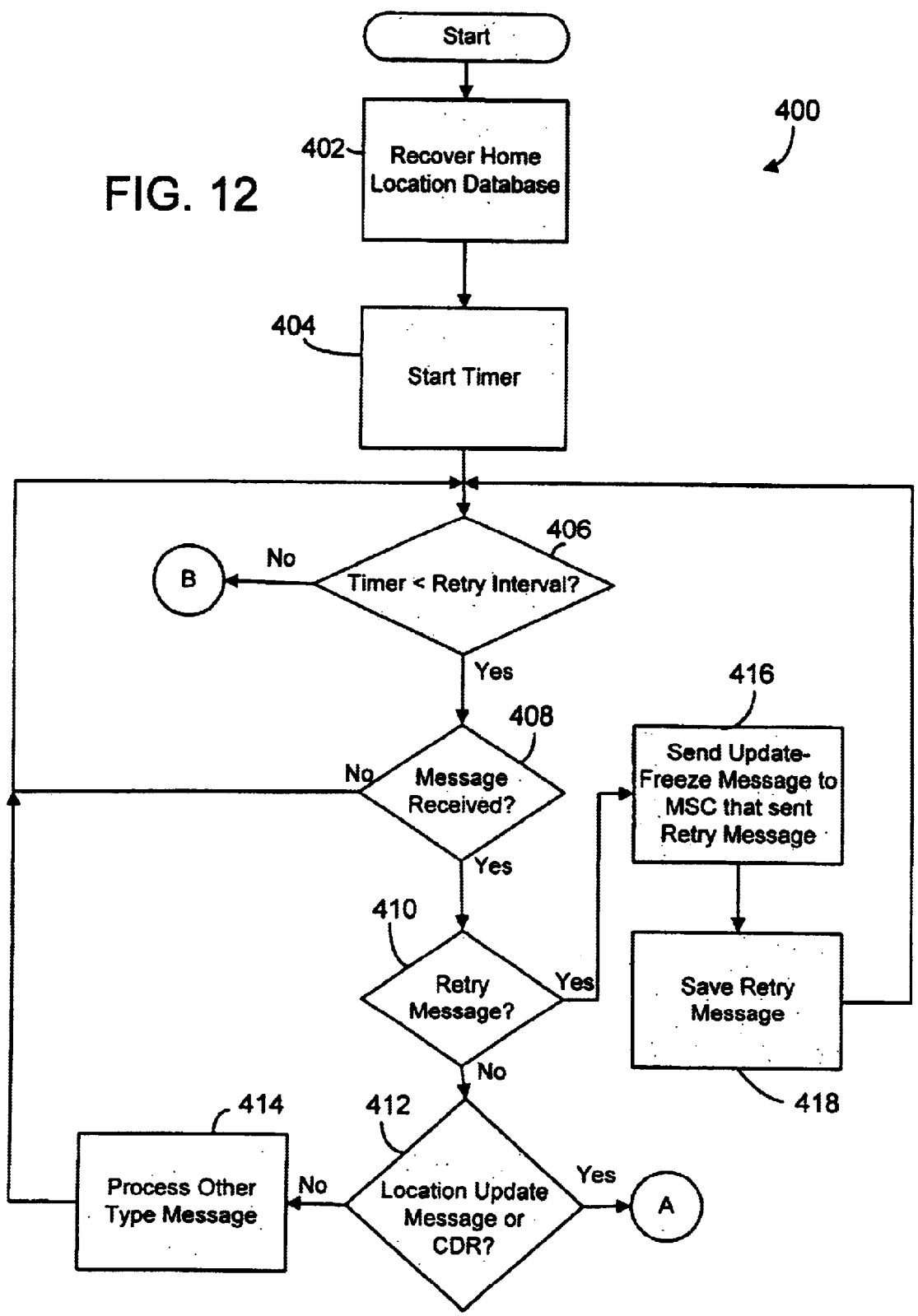
FIGS. 12–14 are flow diagrams of a first function performed by the recovery and update processor of FIG. 5.
Figure 13:
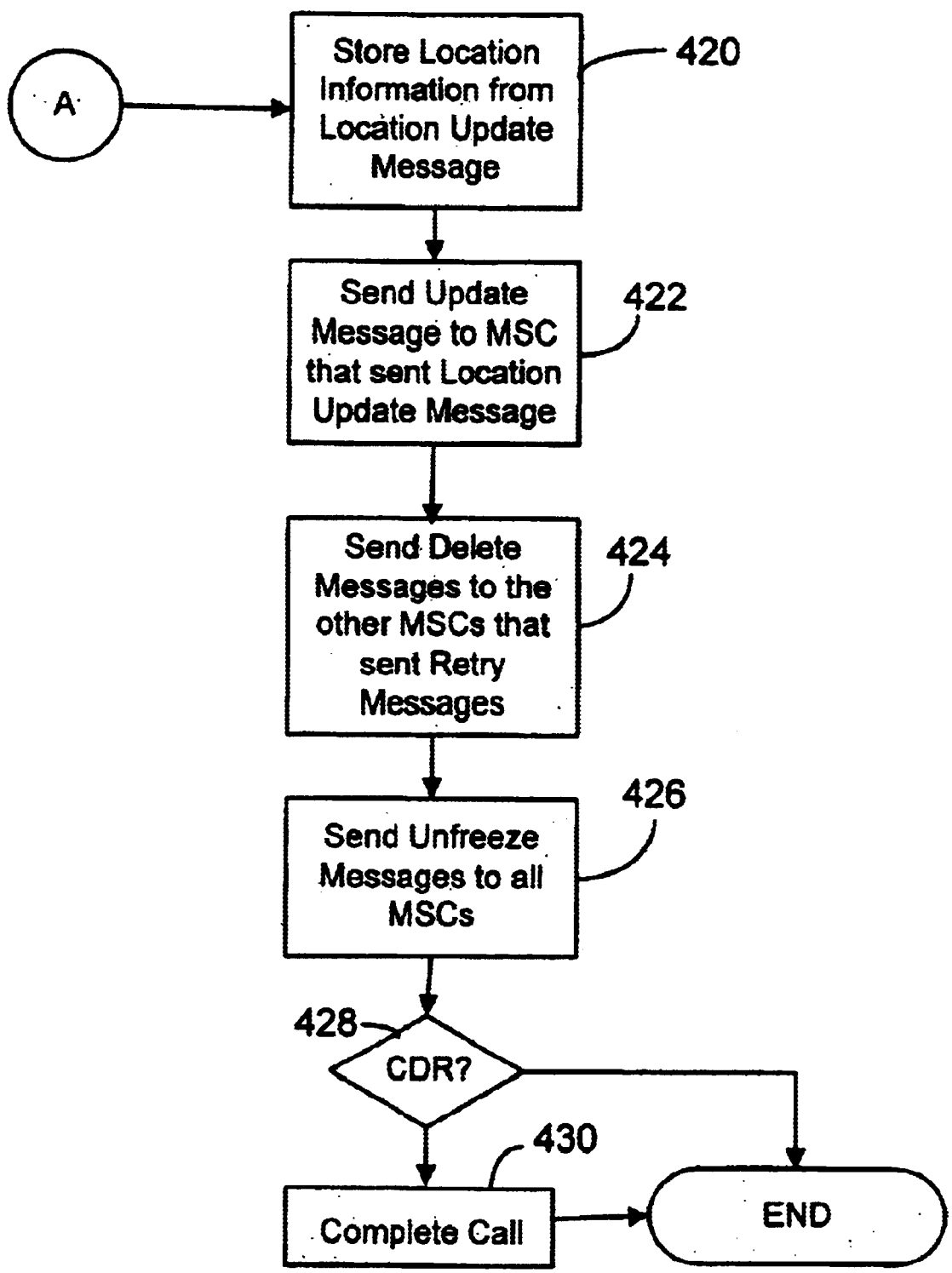
Figure 14:
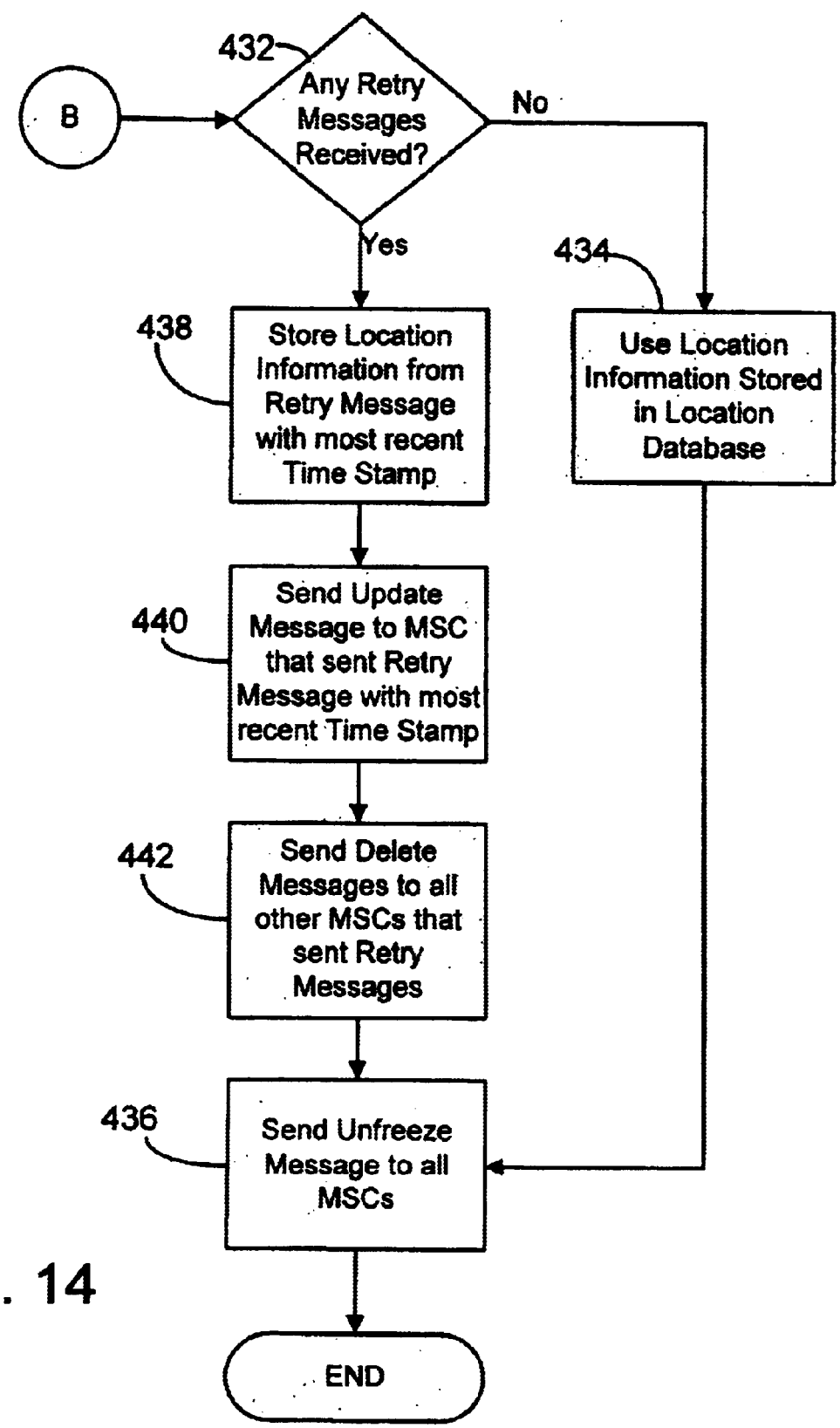

The HLR 226 shown in FIG. 8 is configured and programmed to implement the FRP. A process 400 for recovering the location information for each mobile 16 registered in the HLR 226 is shown in FIGS. 12–14. After a failure has been remedied and the HLR 226 is functional and accessible, the HLR 226 will restore its database if necessary (for example, by restoring the database from the periodic backups and redundant array of disks) at step 402. Then the HLR 226 enters a recovery period in which the HLR 226 determines, in accordance with the FRP, whether each of the mobiles 16 registered with the global database server moved to a new location area during the failure period. At step 404, a recovery timer is started that keeps track of the amount of time that has elapsed since the recovery period began. At step 406, the HLR 226 determines if the amount of time that has elapsed since the recovery began is less than the retry interval for the particular mobile 16. If the amount of time that has elapsed since the recovery began is not less than the retry interval for the mobile 16, then process 400 flows to step 432, which is shown in FIG. 14. If the amount of time that has elapsed since the recovery period began is less than the retry interval for the mobile 16, then HLR 226 determines if a message has been received from one of the message switching centers 220 for that mobile 16 at step 408. If a message has not been received by the HLR 226, the process 400 loops back to step 406. If a message has been received by the HLR 226, the message switching center 220 determines, at steps 410 and 412, if the received message is a location update retry message, a location update message, or a CDR message for a mobile 16 registered with the HLR 226. If the received message is not a location update retry message, a location update message, or a CDR message, then the received message is some other type of message, which is processed by the message switching center 220 at step 414. If the received message is a location update retry message, then the HLR 226 sends an update freeze message to the message switching center 220 that sent the location update retry message, at step 416, and saves the location update retry message, at step 418, for subsequent reference. Then the process 400 loops back to step 406.

If the received message is a location update message or a CDR message, then the HLR 226 updates the entry for the mobile 16 with the information contained in the location update message or CDR message, at step 420 shown in FIG. 13. The HLR 226 also sends an update message to the message switching center 220 that sent the location update message or CDR message, at step 422, and sends delete messages to the other message switching centers 220 that have sent location update retry messages during the current recovery period, at step 424. Also, the HLR 226 sends an unfreeze message to all the other message switching centers registered with the HLR 226 in step 426. At steps 428 and 430, if the received message is a CDR message, the HLR 226 attempts to complete the call unless destination for the call is a mobile 16 with a frozen entry in the HLR 226. Then, the recovery process ends.

When the amount of time that has elapsed since the recovery period began is equal to or greater than the retry interval, which is determined at step 406, shown in FIG. 12, the HLR 226 determines if any of location update retry messages have been received by HLR 226 for the mobile 16 during the current recovery period at step 432, which is shown in FIG. 14. If no location update retry messages have been received by the HLR 226 for the mobile 16 during the current recovery period, the HLR 226 uses the entry that already exists in the HLR 226 for the mobile 16, at step 434, and sends an unfreeze message to all the message switching centers 220 that are registered with the HLR, at step 436. Then, the current recovery process ends.

If, however, at least one location update retry message has been received by the HLR 226 for the mobile 16 during the current recovery period, then the HLR 226 updates the entry for the mobile 16 with the information contained in the location update retry message having the most recent time stamp, at step 438. The HLR 226 also sends an update message to the message switching center 220 that sent the location update retry message having the most recent time stamp, at step 440, and sends delete messages to the other message switching centers 220 that sent location update retry messages during the current recovery period, at step 442. Also, the HLR 226 sends an unfreeze message for that mobile to all the other message switching centers 220 registered with the HLR 226 in step 436. Then, the current recovery process ends.

As noted above, the FRP can be used to recover from both database and link failures. The global database server 102 starts the recovery period once a database failure is resolved. With respect to link failures, the global database server 102 detects that a link failure has occurred and has been resolved when the global database server 102 receives a location update retry message during a non-recovery period. Upon receiving the location update retry message during a non-recovery period, the global database server 102 initiates the recovery period and the recovery process 400.

In addition, if the database and link failures typically last only for a short period of time, i.e., a period of time in which most mobiles change location areas no more than one time, then the FRP described above can be modified to respond to each location update retry message as if it were a location update message. In other words, upon receiving a location update retry message, the global database server 102 sends a delete message to the location update processor 104 indicated by the current entry in the global location database 108 for that mobile, updates the entry in the global location database 108 with the location information from the received location update retry message, and sends an update message to the location update processor 104 from which the received location update retry message was sent. However, if the mobile 16 moves more than once during the failure period, more than one location update retry message will be sent. If the first location update retry message received by the global database server 102 does not correspond to the location area in which the mobile 16 is currently located, the global database server 102 (and the VLR 228 associated with the location update process 104 that sent the received location update retry message) will be updated with incorrect location information. Until the global database server 102 receives the location update retry message corresponding to the location area in which the mobile is currently located, any calls to the mobile will be misdirected and lost.

Moreover, the FRP described above can be used to recover from database and link failures that occur to the VLRs 228. When a VLR 228 is in a failure period and the message switching center 220 associated with the VLR 228 attempts to send a VLR update message or VLR delete message to the VLR 228 in order to update or delete an entry from the VLR 228, the VLR update message or VLR delete message will not be received by the VLR 228. After the predetermined retry interval s has elapsed since the VLR update message or VLR delete message was sent, the message switching center 220 will send a VLR update retry message or VLR delete message, respectively, to the VLR 228, and the message switching center 220 will resend the VLR update retry message or VLR delete retry message at the end of each successive predetermined retry interval s thereafter until the VLR update message, VLR update retry message, VLR delete message or VLR delete retry message is received by the VLR 228.

Upon resolving the failure, the VLR 228 restores its local database, if necessary (for example, by restoring the local database from periodic backups and/or a redundant array of disks) in the same manner as the global database 108 is restored. Then the VLR 228 enters a recovery period in which the VLR 228 determines, in accordance with the FRP, whether each entry in the VLR 228 should be updated, deleted, or left alone.

In general, the operation of the FRP for recovering from a failure to a VLR 228 is generally the same as with a failure to a global database server 102 and can be characterized by the three cases noted above. In the first case, the VLR 228 receives a VLR update message, a VLR delete message, or a query in response to a call delivery request during the recovery period. If the VLR 228 receives a VLR update message, the VLR 228 updates its entry for the mobile associated with the received VLR update message. If the VLR 228 receives a VLR delete message, the VLR 228 deletes its entry for the mobile associated with the received VLR delete message. If the VLR 228 receives a query in response to a call delivery request, the VLR 228 knows that the mobile referenced by the query is located in the location area of the VLR 228 (because either the HLR 226 directed the call delivery request to then message switching center 220 associated with the VLR 228 or the mobile 16 sent a call delivery request to the message switching center 220 associated with the VLR 228) and therefore, the VLR 228 updates its entry for the mobile (or creates one if one does not exist) with the location information for the mobile 16.

In the second case, the VLR 228 does not receive a VLR update message, a VLR delete message, or a query in response to a call delivery request during the recovery period and at least one VLR update retry message or at least one VLR delete message is received by the VLR 228 during the recovery period. In the second case, the VLR 228 determines which of the VLR update retry messages and VLR delete retry messages it has received has the most recent time stamp. If the message having the most recent time stamp is a VLR delete retry message, then, if an entry exists in the VLR 228 for that mobile 16, the VLR 228 deletes the entry. If the message having the most recent time stamp is a VLR update retry message or query in response to call delivery request, then the VLR 228 creates an entry for the mobile in the VLR 228 (or updates an existing entry for the mobile 16 if one already exists in the VLR 228) using the location information contained in the received message or query.

In the third case, the VLR 228 does not receive, for a given mobile 16, a VLR update message, a VLR delete message, a query in response to a call delivery request, a VLR update retry message, or a VLR delete retry message during the recovery period. After the predetermined retry interval s has elapsed since the recovery period started, the VLR 228 knows that the mobile 16 did not change location areas during the failure period and that the entry in the VLR 228 for the mobile is still valid. Therefore, the recovery period of the VLR 228 is bounded by the predetermined retry interval s.

Figure 15:
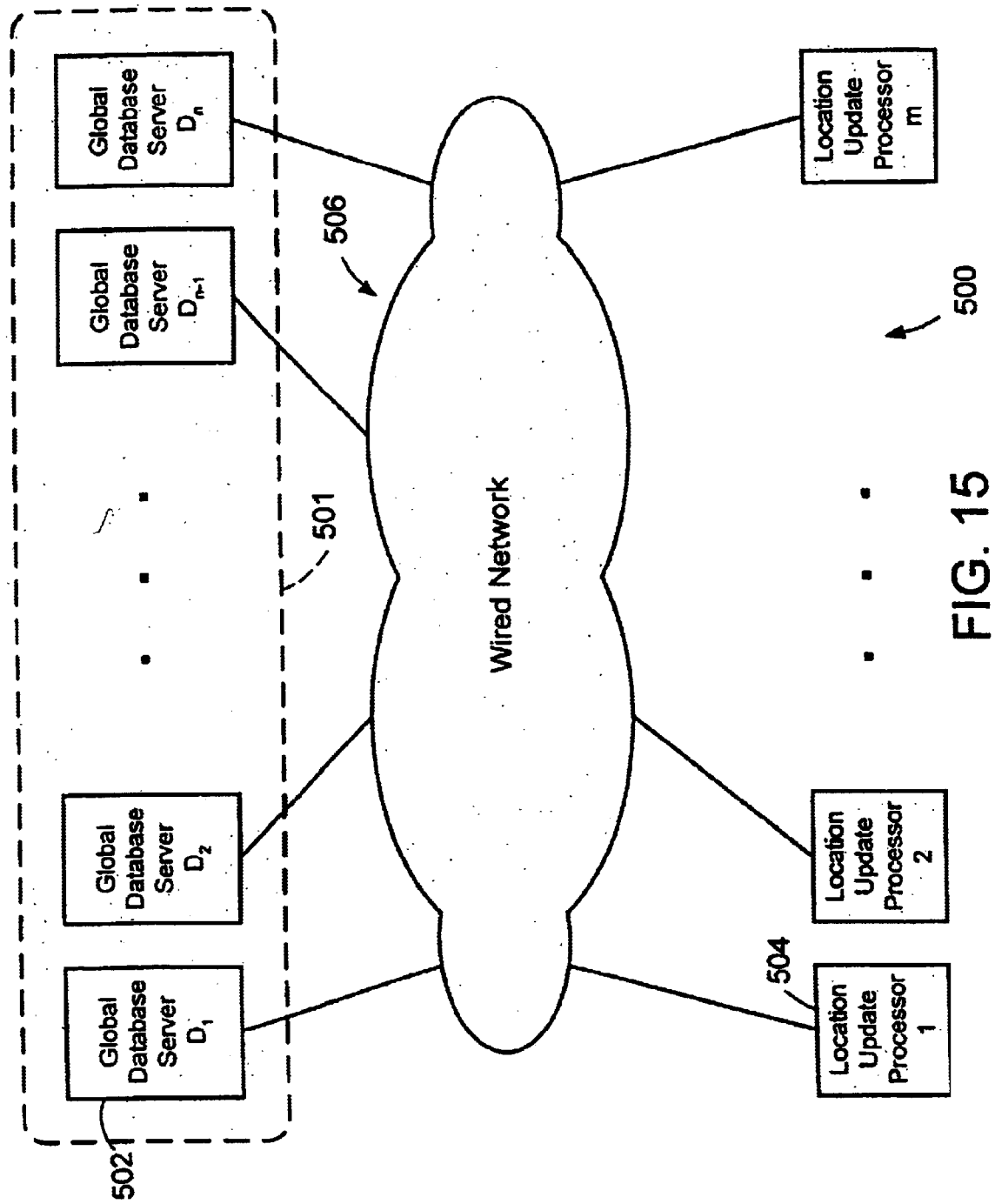
FIG. 15 is a block diagram of a second embodiment of a location information recovery and management system.

Location information recovery and management system 500, a second embodiment of a location information recovery and management system 100 of the type shown in FIG. 5, is shown in FIG. 15. The location information recovery and management system 500 has a distributed location information database architecture 501. The distributed database architecture 501 includes a plurality of global database servers 502. The plurality of global database servers 502 are connected via a wired network 506 to each other and to a plurality of location update processors 504.

As with the global database server 102 described above, each of the global database servers 502 includes a global database (not shown in FIG. 15) for storing location and service information about a plurality of mobiles 16 (only one of which is shown in FIG. 15) that is sent to the global database server 502 by one of the location update processors 504. Each of the global database servers 502 also includes a recovery processor (not shown in FIG. 15) for receiving, processing, and sending messages. The recovery processor also is operatively connected to the global database (not shown in FIG. 15) so that, for example, location information received for the mobile 16 from the location update processor 504 can be stored in the global database.

As with the location update processors 104 described above, each location update processor 504 includes a receiver (not shown in FIG. 15) for receiving messages from the plurality of mobiles 16, a message processor (not shown in FIG. 15) for processing, receiving, and sending messages to and from the mobiles 16 and the global database server 502, and a local database server (not shown in FIG. 15). The local database server includes a local database processor for processing update and query requests from the message processor and a local database for storing location and service information about the mobiles 16 that are registered or otherwise serviced by the location update processor 504.

In the system 500, location and service information about each mobile 16 that is registered with the plurality of global database servers 502 is stored in more than one of the global database servers 502. In the following discussion, the number k represents the number of global database servers 502 in which information about the mobile 16 is stored and n represents the total number of global database servers 502 in the system 500. When a mobile 16 enters a different location area, the location information for the mobile 16 is stored in k global database servers 502. Preferably, the k global database servers that are selected for each mobile 16 are selected so that the load on the n global database servers 502 is "balanced" (that is, so that on average, each of the global database severs 502 receives approximately the same number of queries and updates).

Figure 16:
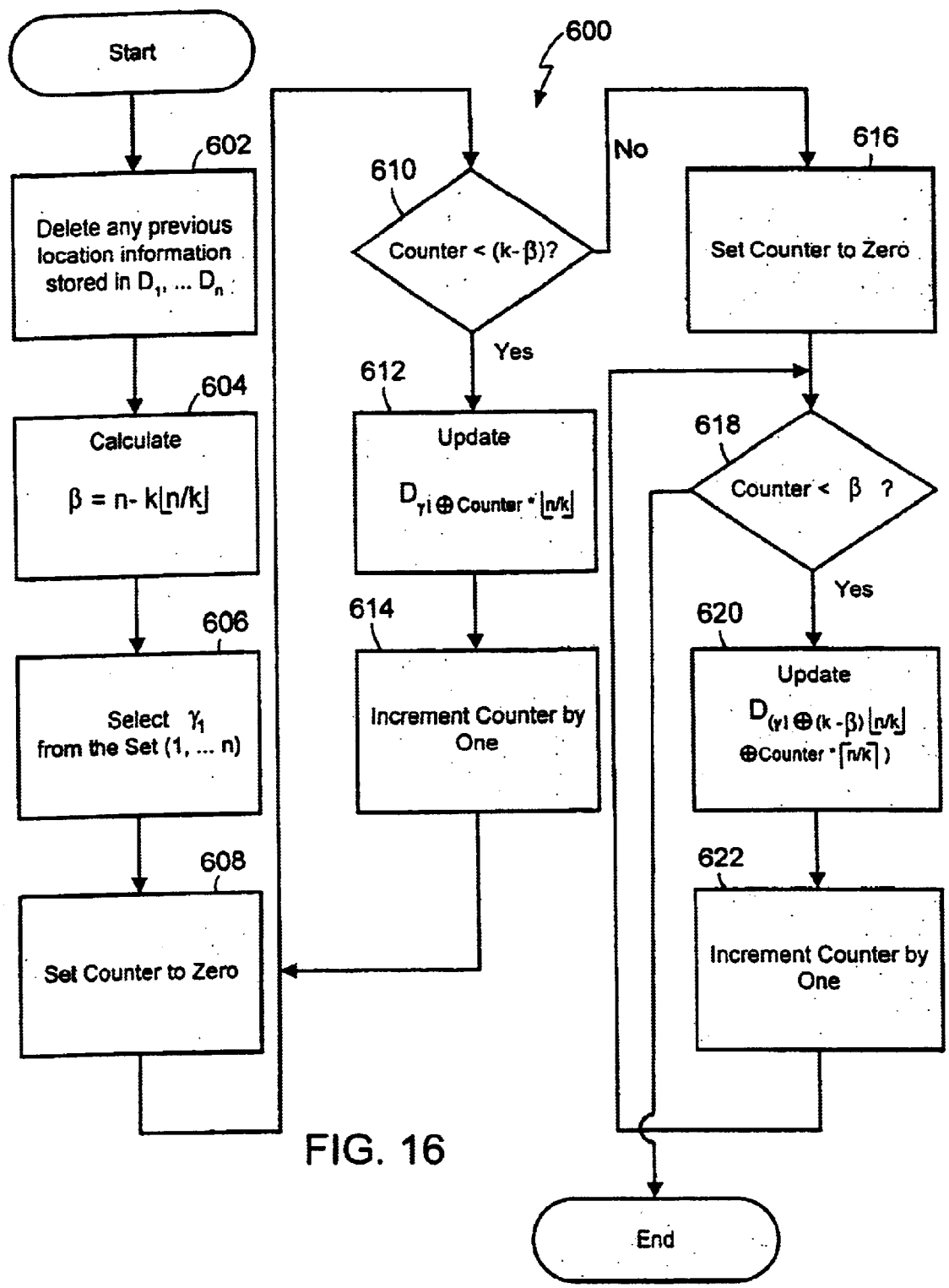
FIG. 16 is a flow diagram of an update process performed by a location update processor in the location information recovery and management system of FIG. 15.

A load balanced update process 600 that can be used to update k global database servers 502 when a mobile 16 enters a new location area is shown in FIG. 16. For a given n and k, let:

$$n = k\alpha + \beta$$

where $\alpha = \lfloor n/k \rfloor$ and $\beta = n - k\alpha$. Also, let $D_1, \ldots, D_n$, represent the n global database servers 502 logically arranged as a ring and let the first global database server 502 to be updated be selected randomly using a uniform distribution over the n global database severs $D_1, \ldots, D_n$. Then the remaining k−1 global database servers 502 to be updated by the update process 600 are selected deterministically at distances $\alpha$ and $\alpha+1$ from the previously updated global database server 502 on the logical ring. The "distance" between two global database servers 502 on the logical ring is determined by how far the two global database servers 502 are separated on the logical ring. For example, global database server $D_i+1$ is a distance of 1 from global database server $D_i$ on the logical ring. For the purposes of the following discussion, let $\sigma = (\gamma_1, \gamma_2, \ldots, \gamma_k)$ be a placement vector, where $\gamma_i \in \{1, 2, \ldots, n\}$ is the index of the ith global database server $D_1, \ldots, D_n$ updated by the process 600. A displacement vector $\hat{a} = (a_1, a_2, \ldots, a_k)$ is defined as a binary vector having a Hamming weight of $\beta$. Having selected a first database index $\gamma_i$ uniformly, the process 600 selects the remaining k−1 global database servers 502 to be updated according to:

$$\gamma_{i+1} = \gamma_i \oplus \lfloor n/k \rfloor a_i \text{ for } i=1, \ldots, k-1,$$

where $\oplus$ denotes modulo addition defined over the set $\{1, 2, \ldots, n\}$.

The displacement vector $\hat{A}$ can be fixed a priori, as is done in process 600, or can be randomly generated at each update. Preferably the Hamming weight is $\beta$. When k is a divisor of n, the process 600 selects equidistant global database servers 502 on the logical ring with a random phase.

The update process 600 attempts to delete the previously stored location information for the mobile 16 from the k global database servers 502 that previously stored the location information for the mobile 16 in step 602. The location update processor 504 sends "location delete messages" to the k global databases that previously stored the location information of the mobile 16. The location update processor 504 can identify the global database servers 502 in which the location information for the mobile 16 is stored from the mobile 16 (for example, by sending a message to the mobile requesting such information) or by querying each of the n global databases 502.

A value for $\beta$ is calculated using the equation $n - k\lfloor n/k \rfloor$ in step 604. The first global database server 502 to be updated is selected by randomly selecting a $\gamma_i$ from the set $\{1, 2, \ldots, n\}$ in step 606. Preferably, the same set of global database servers 502 are not used repeatedly for updates since some of the mobiles 16 may be queried more frequently (for example, due to frequent call activity) or may require more updates than other mobiles 16, which would result in the global database servers 502 that store the location information of the more active mobiles 16 having a higher load than the global database servers 502 that store the location information of the less active mobiles 16. The location update processor 504 therefore preferably generates a fresh random number to select the first global database server 502 for updating during each update.

A counter is set to zero in step 608. Then while the counter is less than $k-\beta$ (which is determined in step 610), the next global database server 502 to be updated is sent a location update message in step 612. The next global database server that is to be updated is the global database server $D_{\gamma_1 \oplus (counter*\lfloor n/k \rfloor)}$ on the logical ring. Then the counter is incremented by one in step 614 and the process 600 loops back to step 610. When the counter is equal to or greater than $k-\beta$ as is determined in step 610, the counter is set to zero in step 616, and then while the counter is less than $\beta$ (which is determined in step 618), the next global database server 502 to be updated is sent a location update message in step 620. The next global database server that is to be updated is the global database server $D_{(\gamma_1 \oplus (k-\beta)\lfloor n/k \rfloor \oplus (counter*\lceil n/k \rceil))}$ on the logical ring. Then the counter is incremented by one in step 622, and the process 600 loops back to step 618. When the counter is equal to or greater than $\beta$ as is determined in step 618, the process 600 ends.

Figure 17:
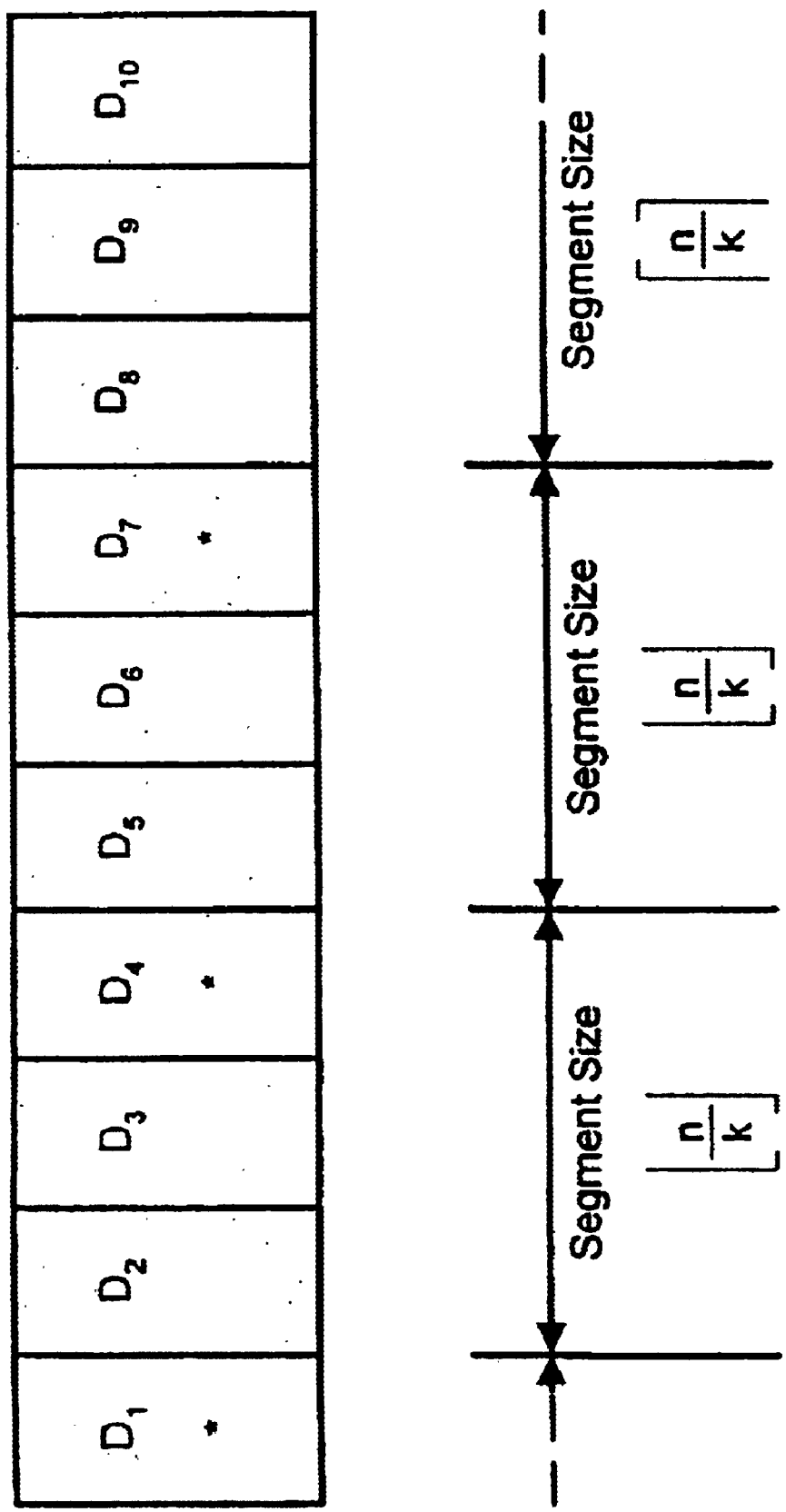
FIG. 17 is a diagram showing the operation of the update process of FIG. 16.

The process 600 shown in FIG. 16 selects the first global database server 502 to be sent a location update message randomly, then sends location update messages to the next $k-\beta$ global database servers 502 that are separated on the logical ring by a distance of $\lfloor n/k \rfloor$ and sends location update messages to the following $\beta$ global information database servers 502 that are separated on the logical ring by a distance of $\lceil n/k \rceil$. For example, as shown in FIG. 17, if n equals 10 and k equals 3 (so that $\beta$ equals 1) and the first global database server to be sent a location update message is $D_1$, the process 600 will send location update messages to global database servers $D_1$, $D_4$, and $D_7$. The global database servers $D_1$ and $D_4$ and $D_4$ and $D_7$ are separated by a distance of 3 and $D_7$ and $D_1$ are separated by a distance of 4 on the logical ring.

The fast recovery protocol described above can be used with system 500 to recover a global database server 502 after a database or link failure is remedied. According to the FRP, when a mobile 16 moves into a different location area, the mobile 16 sends a mobile update message to the location update processor 504 associated with the location area that the mobile 16 has just entered. The mobile 16 time stamps the mobile update message. After receiving the mobile update message, according to the process 600 shown in FIG. 16, the location update processor 504 sends location delete messages to the k global database servers 502 that previously stored information for the mobile 16 and sends location update messages to k newly selected global database servers 502. If the location update processor 504 does not receive messages confirming that each global database server 502 that was sent a location delete message in step 602 or a location update message in steps 612 and 620 has indeed received the location delete message or location update message after a predetermined retry interval s has elapsed since each of the messages was sent, the location update processor 504 sends a "location delete retry message" (if a location delete message was not received) or a location update retry message (if a location update message was not received). Both the location delete retry message and the location update retry message contain information (including the location information and time stamp) from the location delete message or the location update message, respectively. A global database server 502 will not receive any messages when the global database server 502 is inaccessible (for example, because the global database server 502 is not fully operational or because a link connecting the global database server 502 to one or more location update processors 504 is down). Subsequently, the location update processor 504 resends the location delete retry message or the location update retry message after each predetermined retry interval s elapses until the location update processor 504 receives a message from the global database server 502 confirming that the global database server 502 has received the location delete message, the location delete retry message, the location update message, or the location update retry message.

A global database server 502, after becoming fully functional and accessible, restores the global database, if necessary (for example, by restoring the global database from the periodic backups and redundant array of disks). Then the global database server 502 enters a recovery period in which the global database server 502 determines, in accordance with the FRP, whether each entry in the global database server 502 should be deleted, updated, or left alone.

The operation of the FRP in the system 500 during the recovery period can be characterized by three cases, which are similar to the three cases discussed above in connection with system 100. The first case is where the global database server 502 receives a location delete message, location update message, or call delivery request for a mobile 16 during the recovery period. If the global database server 502 receives a location delete message, location update message, or call delivery request for a mobile 16 during the recovery period, the global database 502 can determine in which location area the mobile 16 is located and whether or not the global database server 504 should have an entry for that mobile 16 stored in the global database associated with the global database server 502. If a location delete message is received by the global database server 502, then, if an entry for that mobile 16 exists in the global database associated with the global database server 502, the global database server 502 deletes the entry and sends a message (such as a delete message) back to the location update processor 504 that sent the location delete message to confirm that global database server 502 has received the location delete message. Similarly, if a location update message or call delivery request is received by the global database server 502, then the global database server 502 creates an entry for the mobile in the global database server's global database (or updates an existing entry for the mobile 16 if one exists in the global database) using the location information contained in the received message. Also, if a location update message was received, the global database server 502 sends a message (such as an update message) back to the location update processor 504 that sent the location update message to confirm that global database server 502 has received the location update message. The recovery period for that mobile, therefore, ends when the global data server 502 receives a location delete message, a location update message, or a call delivery request.

In the second case that characterizes the operation of the FRP with system 500, a location delete message, location update message, or call delivery request is not received by the global database server 502 during the recovery period and at least one location delete retry message or at least one location update retry message is received by the global database server 502 during the recovery period. Unlike when the global database server 502 receives a location delete message, location update message, or call delivery request during the recovery period, when the global database server 502 does not receive a location delete message, location update message, or call delivery request during the recovery period, the global database server 502 cannot be certain that the mobile 16 is in the location area indicated by any location delete retry message that the global database server 502 receives because the mobile 16 may have moved into and out of more than one location area during the failure period and may have returned to the location area associated with the location update processor 504 that sent the location delete retry message. Moreover, the global database server 502 cannot be certain that the mobile 16 is in the location area indicated by any location update retry message that the global database server 502 receives because the mobile 16 may have moved into more than one location area during the failure period and may no longer reside in the location area associated with the location update processor 504 that sent the location update retry message. When the predetermined retry interval s has elapsed since the global database server 502 initiated the recovery period, the global database server 502 knows that at least one location delete message and at least one location update retry message for the mobile 16 has been received from each location update processor 504 that sent a location delete message or location update message for that mobile 16 during the failure period. The global database server 502 knows this because location delete retry messages and location update retry messages are sent once every predetermined retry interval s; therefore, any location update processor 504 that sent a location delete message or location update message for the mobile 16 during the failure period will send a location delete retry message or location update retry message corresponding to the location delete message or location update message, respectively, sent during the failure period once during the recovery period that starts when the global database server 502 initiates the recovery period and ends after the predetermined retry interval s has elapsed since the start of the recovery period.

After the predetermined retry interval s has elapsed since the start of the recovery period, the global database server 502 determines which of the location update retry messages and location delete retry messages received by the global database server 502 during the recovery period has the most recent time stamp. If the message having the most recent time stamp is a location delete retry message, then, if an entry for that mobile 16 exists in the global database associated with that global database server 502, the global database server 502 deletes the entry. The global database server 502 also sends a message (such as a delete message) back to the location update processor 504 that sent the location delete message to confirm that global database server 502 has received the location delete retry message. Similarly, if the message having the most recent time stamp is a location update retry message, then the global database server 502 creates an entry for the mobile in the global database server's global database (or updates an existing entry for the mobile 16 if one already exists in the global database) using the location information contained in the received message. The global database server 502 also sends a message (such as an update message) back to the location update processor 504 that sent the location update message to confirm that global database server 502 has received the location update retry message. The global database server 502 sends delete messages to each location update processor 504 that sent a location update delete message or a location update retry message to the global database server 502 during the recovery period other than the location update processor 504 that sent the most recent location delete retry message or location update retry message. Therefore, the recovery period for that mobile 16 ends when the predetermined retry interval s has elapsed since the recovery period began.

In the third case that characterizes the operation of the FRP, the global database server 502 does not receive a location delete message, a location update message, a call delivery request, a location delete retry message, or a location update retry message during the recovery period. When the predetermined retry interval s has elapsed since the global database server 102 initiated the recovery period and no location delete message, location update message, call delivery request, location delete retry message, or location update retry message has been received by the global database server 502 since the start of the recovery period, the global database server 502 knows that the mobile 16 has not moved during the failure period because, if the mobile 16 had moved during the failure period, the global database server 502 would have received a location delete retry message or location update retry message for the mobile 16. As a result, the global database server 502 knows that the entry for the mobile 16 in the global database server's global database is correct. Therefore, the recovery period ends for the mobile 16 after the predetermined retry interval has elapsed since the start of the recovery period.

Therefore, the recovery period for each mobile 16 ends either when a location delete message, a location update message, or a call delivery request is received by the global database server 502 or after the predetermined retry interval s has elapsed since the beginning of the recovery period, whichever occurs first. As a result, the recovery period using the FRP is bounded by the predetermined retry interval s (assuming the predetermined retry interval s is much larger than the latency of the wired network).

An alternative way of implementing the FRP in system 500 is to modify the update process 600 to attempt to locate a group of k global database servers 502 that are all currently accessible. In such a modified update process, the location update processor 504 selects a first group of k global database servers 502 to update, but prior to sending location update messages, checks if the first group of k global database servers 502 are accessible. If any of the k selected global database servers 502 are inaccessible, the modified update process repeatedly selects a new group of k global database servers 502 until a group of k global database servers 502 is selected in which all the global database servers 502 are accessible. Then the location update messages are sent to the selected, accessible global database servers 502. If a group of k global database servers 502 in which all the global database servers 502 are accessible cannot be selected, then the group of k global database servers 502 having the highest number of accessible global database servers 502 is used. Location update messages are sent to each of the k selected global database servers 502. The FRP is used to properly update the inaccessible global database servers 502 that are unable to receive the sent location update messages once those global database servers 502 become accessible.

Figure 18:
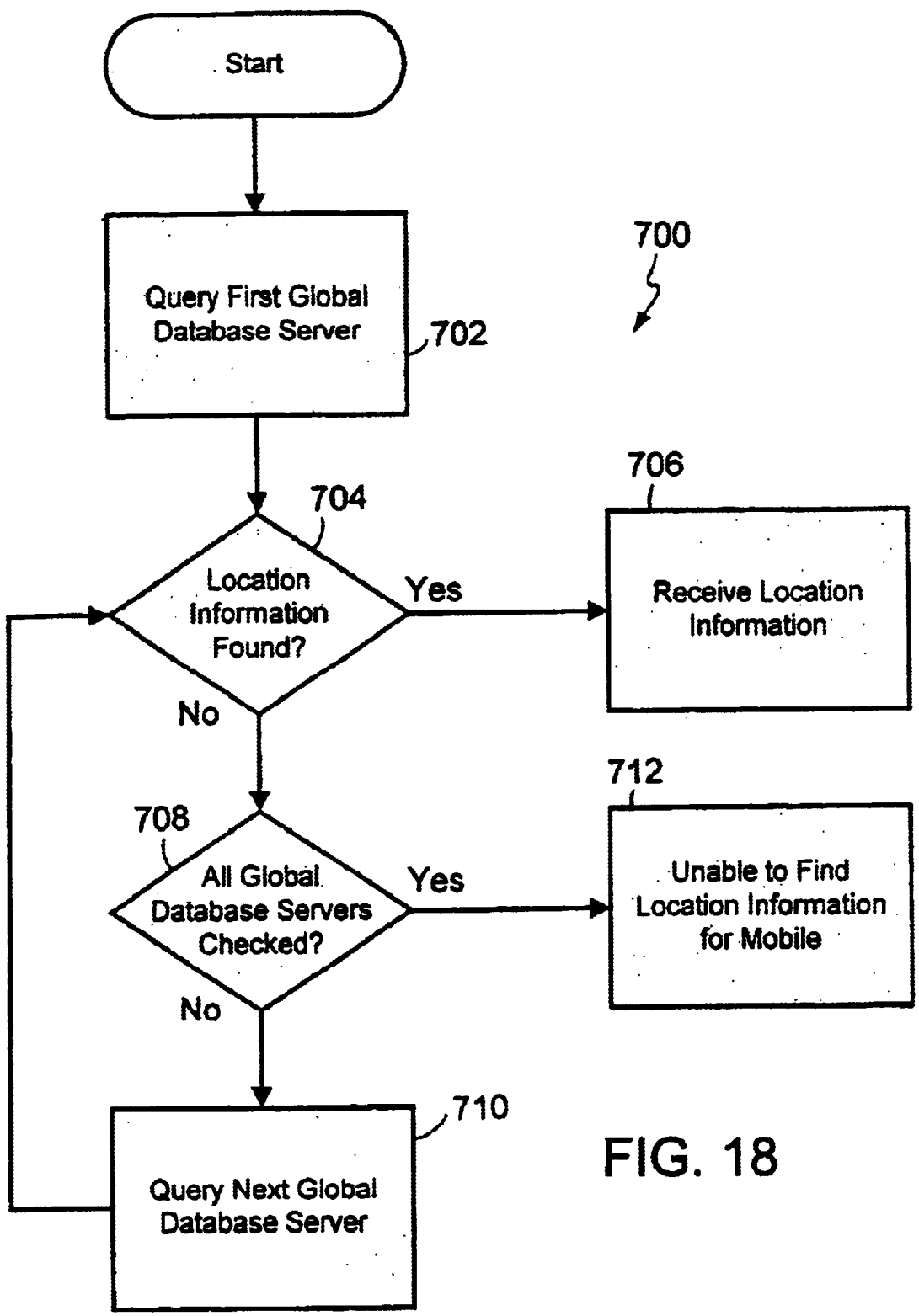
FIG. 18 is a flow diagram of a first embodiment of a query process performed by a location update processor in the location information recovery and management system of FIG. 15.

When a location update processor 504 (or other device in system 500) needs to obtain information about a particular mobile 16, the location update processor 504 can query the global database servers 502 to obtain information about the mobile 16. A process 700 for querying the global database servers 502 of the system 500 is shown in FIG. 18. A first global database server on the logical ring of global database servers $D_1, \ldots, D_n$ is randomly selected and queried in step 702. If location information for the particular mobile 16 is found in the selected global database server (as checked in step 704), the location information is returned by the first global database server 502, in step 706. Otherwise, each successive global database server on the logical ring is queried in turn (in step 710) until either the location information for the mobile 16 is found and returned (steps 704 and 706) or until all the global database servers have been queried (as checked in step 708). If no location information is received from any of the global database servers, the call delivery request or other function requiring information about the mobile cannot be performed (as shown in step 712).

Figure 19:
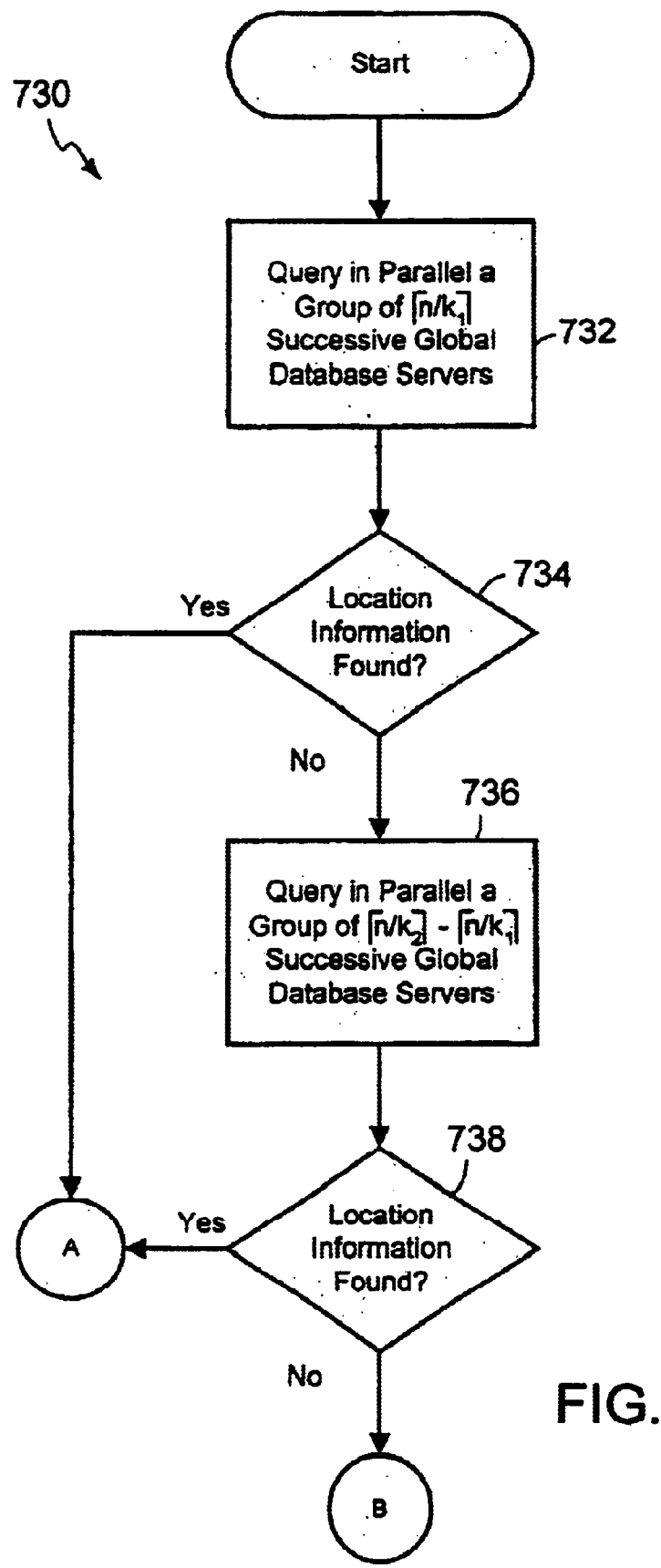
FIGS. 19–20 are flow diagrams of a second embodiment of a query process performed by a location update processor in the location information recovery and management system of FIG. 15.
Figure 20:
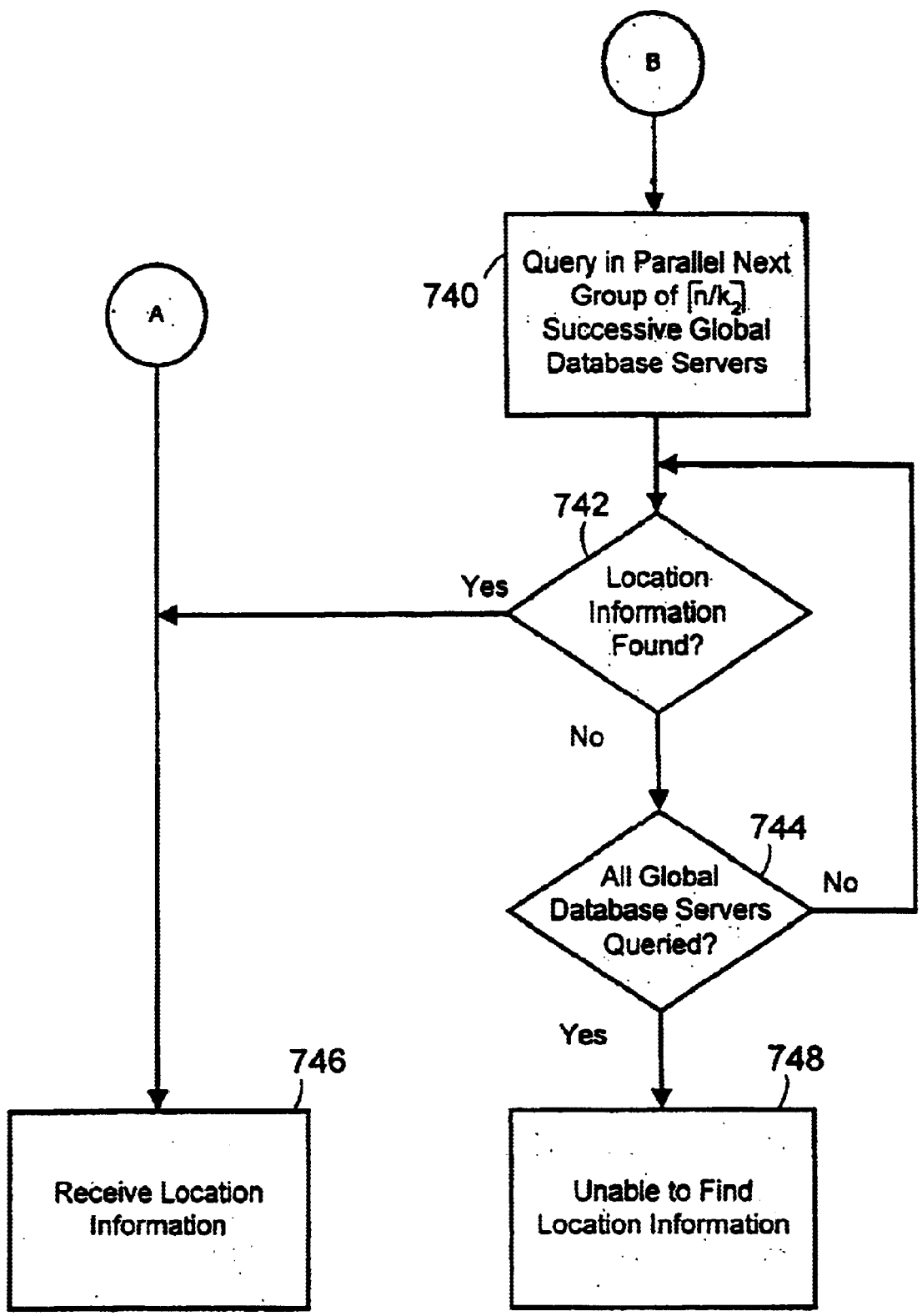

If the population of mobiles can be classified into two classes—active mobiles, which have a relatively high degree of call activity, and relaxed mobiles, which have a relatively low degree of call activity, a second query process 730, shown in FIGS. 19–20, can be used to retrieve location information from the plurality of global database servers 502. The active mobiles 16 have their location information stored in $k_1$ of the global database servers 502, and the relaxed mobiles have their location information stored in $k_2$ of the global database servers 502. Because the active mobiles have a relatively higher degree of call activity than the relaxed mobiles, the location information for the active mobiles are stored in more of the global database servers 502 than the relaxed mobiles. In other words, $k_1 > k_2$. By storing location information about the active mobiles in more global database servers than the relaxed mobiles, the query delay time for the active mobiles should be reduced at the expense of greater storage costs for the information about the active mobiles. On the other hand, the query time for the relaxed mobiles will be higher relative to the active mobiles, but will have lower storage costs.

When location information about a particular mobile is retrieved from the global database servers 502 using process 730, the process 730 first assumes that the mobile is an active mobile and queries in parallel a group of $\lceil n/k_1 \rceil$ successive global database servers 502 starting with a randomly selected global database server 502, in step 732. If location information for the mobile is not located in the first group of $\lceil n/k_1 \rceil$ global database servers, as checked in step 734 (for example, if the mobile is a relaxed mobile), the next $\lceil n/k_2 \rceil - \lceil n/k_1 \rceil$ successive global database servers 502 are queried in step 736. If location information for the mobile is not located in the next $\lceil n/k_2 \rceil - \lceil n/k_1 \rceil$ successive global database servers 502, as checked in step 738 (for example, if one of the queried global database servers 502 has information about the mobile but is inaccessible), the rest of the global database servers 502 are queried in groups of $\lceil n/k_2 \rceil$ global database servers 502, in step 740 shown in FIG. 20, until location information for the mobile is found, as checked in step 742, or until all global database servers 502 have been queried, as checked in 744. If a queried global database server 502 has location information about the mobile, the global database server 502 returns the information to the querying location update processor 504. If a queried global database server 502 does not have location information about the mobile, the global database server 502 preferably does not send a message to the querying location update processor 504 indicating that it does not have information about the mobile in order to reduce the amount of information transmitted on the wired network 506. Instead, the querying location update processor 504 preferably determines that a queried global database server 502 does not have information about a mobile 16 when it does not receive a message from the queried global database server 502. If location information for the mobile 16 is found in a global database server 502, the location information is returned to the location update processor 504, which uses the location information to carry out whatever function prompted the query (as shown in step 746). If no location information is returned from any of the global database servers 502, however, the call delivery request or other function requiring information about the mobile cannot be performed (as shown in step 748).

The techniques, methods and systems described herein may find applicability in any communications, computing, or processing network environment. For example, these techniques, methods, and systems may find applicability in other types of distributed database systems in which load balanced queries and updates are made and the costs of accessing the databases are approximately the same.

The invention may be implemented in digital electronic circuitry, or in computer hardware, firmware, software or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operation on input data and generating output. The invention advantageously may be implemented in one or more computer programs that are executable on a programmable system including at least one programmable processor coupled to receive data and instructions from, and to transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or random access memory. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks; magneto-optical disks; and CD-ROM disks. Any of the foregoing may be supplemented by, or incorporated in, specially-designed ASICs (application-specific integrated circuits).

Other embodiments are within the scope of the following claims.

What is claimed is:

1. A method for managing information concerning the location of a mobile device in a mobile communication network, the method comprising:

maintaining a location database that stores location information indicative of the location of the mobile device;

receiving location update messages from the mobile device via a location update processor associated with a particular location area within the network when the location of the mobile device changes;

transmitting the location update messages to the location database, and in the event one of the location update messages is not received by the location database, transmitting location update retry messages from the location update processor at the end of successive retry intervals until one of the location update retry messages is received, wherein the act of maintaining a location database comprises maintaining a plurality of location databases that store location information indicative of the location of the mobile device, and wherein the plurality of location databases comprises n location databases, D1, ..., Dn, arranged in a logical ring for storing location information about a mobile device, and the act of transmitting the location update messages to the location database comprises transmitting location update messages to k of the n location databases.

2. The method of claim 1, wherein the location update message includes a time stamp and the location update retry messages include the time stamp from the location update message.

3. The method of claim 2, further comprising:

receiving call delivery request messages from the mobile device via the location update processor; and transmitting at least a subset of the call delivery request messages to the location database.

4. The method of claim 3, further comprising:

recovering location information for the mobile device after a failure in the mobile communication network, wherein the act of recovering includes:

if a location update message or a call delivery request message is received before the retry interval has passed since the failure was removed from the mobile communication network, storing in the location database the location information for the mobile device from the location update message or the call delivery request message; and if the retry interval has passed since the failure was removed from the mobile communication network without receiving a location update message or a call delivery request message while receiving at least one location update retry message, storing in the location database the location information for the mobile device from the location update retry message having the most recent time stamp.

5. The method of claim 4, wherein the act of recovering location information for the mobile device after a failure in the mobile communication network further includes using the location information stored in the location database for the mobile device just before the failure as the location information for the mobile device, if the retry interval has passed since the failure was removed from the mobile communication network without receiving a location update message or at least one location update retry message.

6. The method of claim 5, further comprising maintaining a local location database that is associated with the location update processor and that stores location information indicative of the location of the mobile device when the mobile device is located in the particular location area associated with the location update processor.

7. The method of claim 6, wherein the act of recovering location information for the mobile device after a failure in the mobile communication network further includes:

freezing the local location database after the failure in the mobile communication network; and unfreezing the local location database after the location information for the mobile device has been recovered.

8. The method of claim 1, wherein $\Gamma=(\gamma 1, \gamma 2, \ldots, \gamma k)$ is a placement vector and $\gamma i \in \{1, 2, \ldots, n\}$ is the index of the ith database to which a location update message is transmitted, and the act of transmitting the location update messages comprises:

selecting γ1 from the set (1, 2, . . . , n);

for i=1, . . . , k−1, selecting γi+1 according to $\gamma_i rFn/kL+a_i$, wherein:

r is modulo addition defined over the set (1, 2, . . . , n);

displacement vector â=(a1, a2, . . . , ak) is a binary vector having a Hamming weight of β; and β=n−Fn/kL*k; and transmitting location update messages to the k location databases, Dγ1, . . . , Dγk.

9. The method of claim 8, further comprising, before transmitting location update messages to the k location databases, Dγ1, . . . , Dγk, deleting any location information previously stored in the n location databases, D1, . . . , Dn, for the mobile device.

10. The method of claim 8, wherein γ1 is selected randomly using a uniform distribution over the set (1, 2, . . . , n).

11. The method of claim 10, further comprising, before transmitting location update messages to the k location databases, Dγ1, . . . , Dγk, determining if all of the databases, Dγ1, . . . , Dγk, referred to by the placement vector, Γ=(γ1, . . . , γk), are accessible, and if all of the databases, Dγ1, . . . , Dγk, referred to by the placement vector, Γ=(γ1, . . . , γk), are not accessible, selecting a different placement vector, Γ=(γ1, . . . , γk).

12. The method of claim 11, wherein if no placement vector, γ=(γ1, . . . , γk), can be found in which all the databases, Dγ1, . . . , Dγk, referred to by the placement vector, Γ=(γ1, . . . , γk), are accessible, selecting the placement vector, Γ=(γ1, . . . , γk), having the most number of databases, Dγ1, . . . , Dγk, that are accessible.

13. The method of claim 8, wherein the displacement vector â comprises:

0, for $a_1, \ldots, a_{k-\beta}$; and 1, for $a_{k-\beta+1}, \ldots, a_k$.

14. The method of claim 1, further comprising querying the location databases for location information about the mobile device.

15. The method of claim 14, wherein the act of querying the location databases comprises querying successive location databases on the logical ring for location information about the mobile device until location information about the mobile device is located or until all the location databases have been queried.

16. The method of claim 14, wherein the act of querying the location databases comprises:

querying a first group of successive location databases on the logical ring in parallel;

if location information about the mobile is not located by querying the first group of successive location databases, querying a second group of successive databases on the logical ring in parallel; and if location information about the mobile is not located by querying the second group of successive location databases, querying additional groups of location databases in parallel until location information for the mobile is located or until all the location databases have been queried.

17. A mobile communication network comprising:

a mobile device;

a location database server having a location database storing location information indicative of the location of the mobile device; and a location update processor that:

receives location update messages from the mobile device when the location of the mobile device changes, transmits the location update messages to the location database, and in the event one of the location update messages is not received by the location database, transmits location update retry messages at the end of successive retry intervals until one of the location update retry messages is received, and wherein the mobile communication network further comprises a plurality of location database servers each having a location database for storing location information indicative of the location of the mobile device, and wherein the plurality of location database servers comprises n location database servers, D1, . . . , Dn, arranged in a logical ring for storing location information about a mobile device, and wherein the location update processor further includes a message processor that transmits location update messages to k of the n location databases, wherein Γ=(γ1, γ2, . . . , γk) is a placement vector and γi∈{1, 2, . . . , n} is the index of the ith database to which a location update message is transmitted.

18. The mobile communication network of claim 17, wherein the location update message includes a time stamp and the location update processor transmits the time stamp from the location update message in the location update retry messages.

19. The mobile communication network of claim 18, wherein the location database server includes a recovery processor, for recovering location information for mobile device after a failure in the mobile communication network, that:

if a location update message is received before the retry interval has passed since the failure was removed from the mobile communication network, stores in the location database the location information for the mobile device from the location update message, and if the retry interval has passed since the failure was removed from the mobile communication network without receiving a location update message while receiving at least one location update retry message, stores in the location database the location information for the mobile device from the location update retry message having the most recent time stamp.

20. The mobile communication network of claim 19, wherein the location update processor includes a local location database that stores location information indicative of the location of the mobile device when the mobile device is located in the particular location area associated with the location update processor.

21. The mobile communication network of claim 20, wherein the recovery processor sends a freeze message to the location update processor after the failure in the mobile communication network and sends unfreeze messages to the location update processor after the location information for the mobile device has been recovered.

22. The mobile communication network of claim 17, wherein the message processor:

selects $\gamma_1$ from the set (1, 2, . . . , n);

for i=1, . . . , k−1, selects γi+1 according to γirFn/kL+ai, wherein:

r is modulo addition defined over the set (1, 2, . . . , n);

displacement vector â=(a1, a2, . . . , ak) is a binary vector having a Hamming weight of β; and $\beta = n - Fn/kL*k$; and transmits location update messages to the k location databases, $D\gamma1, \ldots, D\gamma k$, referred to by the placement vector, $\Gamma=(\gamma1, \ldots, \gamma k)$.

23. The mobile communication network of claim 22, wherein the message processor deletes any location information previously stored in the n location databases, $D1, \ldots, Dn$, for the mobile device, before transmitting the location update messages to the k location databases, $D\gamma1, \ldots, D\gamma k$, referred to by the placement vector, $\Gamma=(\gamma1, \ldots, \gamma k)$.

24. The mobile communication network of claim 23, wherein $\gamma1$ is selected randomly using a uniform distribution over the set $(1, 2, \ldots, n)$.

25. The mobile communication network of claim 24, wherein the message processor determines if all of the databases, $D\gamma1, \ldots, D\gamma k$, referred to by the placement vector, $\Gamma=(\gamma1, \ldots, \gamma k)$, are accessible, and if all of the databases, $D\gamma1, \ldots, D\gamma k$, referred to by the placement vector, $\Gamma=(\gamma1, \ldots, \gamma k)$, are not accessible, selects a different placement vector, $\Gamma=(\gamma1, \ldots, \gamma k)$ before transmitting location update messages to the k location databases, $D\gamma1, \ldots, D\gamma k$.

26. The mobile network of claim 25, wherein the message processor selects the placement vector, $\Gamma=(\gamma1, \ldots, \gamma k)$, having the most number of databases, $D\gamma1, \ldots, D\gamma k$, that are accessible, if no placement vector, $\Gamma=(\gamma1, \ldots, \gamma k)$, can be found in which all the databases, $D\gamma1, \ldots, D\gamma k$, referred to by the placement vector, $\Gamma=(\gamma1, \ldots, \gamma k)$, are accessible.

27. The mobile network of claim 26, wherein the displacement vector â comprises:

0, for $a1, \ldots, ak-\beta$; and 1, for $ak-\beta+1, \ldots, ak$.

28. The mobile network of claim 26, wherein the message processor includes software comprises instructions that cause the message processor to query the location databases for location information about the mobile device.

29. The mobile network of claim 26, wherein the message processor includes software comprises instructions that cause the message processor to query successive location databases on the logical ring for location information about the mobile device until location information about the mobile device is located or until all the location databases have been queried.

30. The mobile network of claim 27, wherein the software further comprises instructions to cause the message processor to:

query a first group of successive location databases on the logical in parallel;

if location information about the mobile is not located by querying the first group of successive location databases, query a second group of successive databases on the logical ring in parallel; and if location information about the mobile is not located by querying the second group of successive location databases, query additional groups of location databases in parallel until location information for the mobile is located or until all the location databases have been queried.

31. The mobile network of claim 17, wherein the location update processor comprises a message switching center.

32. The mobile network of claim 17, wherein the location database server comprises a home location register.

33. The mobile network of claim 20, wherein the local location information database is a visitor location register.

34. A location update processor for use in a mobile communication network having a mobile device and a location database server having a location database storing location information indicative of the location of the mobile device, the location update processor comprising:

a location database for comprising:

a receiver that receives location update messages from the mobile device when the location of the mobile device changes;

a message processor that:

transmits location update messages to the location database server; and in the event one of the location update messages is not received by the location database, transmits location update retry messages at the end of successive retry intervals until one of the location update retry messages is received.

35. A method for managing information concerning the location of a mobile device in a mobile communication network, the method comprising:

maintaining a location database that stores location information indicative of the location of the mobile device;

receiving location update messages from the mobile device via a location update processor associated with a particular location area within the network when the location of the mobile device changes;

transmitting the location update messages to the location database;

in the event one of the location update messages is not received by the location database, transmitting location update retry messages from the location update processor at the end of successive retry intervals until one of the location update retry messages is received, wherein the location update message includes a time stamp and the location update retry messages include the time stamp from the location update message;

receiving call delivery request messages from the mobile device via the location update processor;

transmitting at least a subset of the call delivery request messages to the location database; and recovering location information for the mobile device after a failure in the mobile communication network, wherein the act of recovering includes:

if a location update message or a call delivery request message is received before the retry interval has passed since the failure was removed from the mobile communication network, storing in the location database the location information for the mobile device from the location update message or the call delivery request message; and if the retry interval has passed since the failure was removed from the mobile communication network without receiving a location update message or a call delivery request message while receiving at least one location update retry message, storing in the location database the location information for the mobile device from the location update retry message having the most recent time stamp.

36. A mobile communication network comprising:

a mobile device;

a location database server having a location database storing location information indicative of the location of the mobile device;

a location update processor that:

receives location update messages from the mobile device when the location of the mobile device changes;

transmits the location update messages to the location database; and in the event one of the location update messages is not received by the location database, transmits location update retry messages at the end of successive retry intervals until one of the location update retry messages is received, such that the location update message includes a time stamp and the location update processor transmits the time stamp from the location update message in the location update retry messages; and wherein the location database server includes a recovery processor, for recovering location information for mobile device after a failure in the mobile communication network, that:

if a location update message is received before the retry interval has passed since the failure was removed from the mobile communication network, stores in the location database the location information for the mobile device from the location update message; and if the retry interval has passed since the failure was removed from the mobile communication network without receiving a location update message while receiving at least one location update retry message, stores in the location database the location information for the mobile device from the location update retry message having the most recent time stamp.

* * * * *

UNITED STATES PATENT AND TRADEMARK OFFICE
CERTIFICATE OF CORRECTION

PATENT NO.   : 6,718,173 B1
DATED        : April 6, 2004
INVENTOR(S)  : Govindarajan Krishnamurthi and Arun K. Somani It is certified that error appears in the above-identified patent and that said Letters Patent is hereby corrected as shown below:

Title page,
Item [75], Inventors, please delete "Krishnamurthy" and insert -- Krishnamurthi -- therefor;

Column 2,
Line 27, after "4" please insert -- , --;

Column 5,
Line 53, after "$\gamma_k)$", please insert -- , --;
Line 58, please delete "k," and insert -- $k_1$ -- therefor;
Line 63, please delete "n/k" and insert -- $n/k_2$ -- therefor;

Column 7,
Line 61, please delete "arrays" and insert -- array -- therefor;
Line 63, after "as", please insert -- to --;

Column 14,
Line 38, after "$t_{up})$", please insert -- , --;

Column 15,
Line 64, please delete "associated";
Line 65, after "218", please insert -- associated --;

Column 16,
Line 44, please delete "rexecute" and insert -- re-execute -- therefor;

Column 21,
Line 37, please delete "$\sigma$" and insert -- $\Gamma$ -- therefor;
Line 45, before "$a_i$", please insert -- + --;
Line 49, please delete "$\overline{A}$" and insert -- $\overline{a}$ -- therefor;

UNITED STATES PATENT AND TRADEMARK OFFICE
CERTIFICATE OF CORRECTION

PATENT NO. : 6,718,173 B1
DATED : April 6, 2004
INVENTOR(S) : Govindarajan Krishnamurthi and Arun K. Somani It is certified that error appears in the above-identified patent and that said Letters Patent is hereby corrected as shown below:

Column 29,
Line 30, please delete first occurrence of "$\gamma$" and insert -- $\Gamma$ -- therefor;

Column 31,
Line 35, after "software", please insert -- that --;
Line 39, after "software", please insert -- that --.

Signed and Sealed this

Tenth Day of August, 2004

JON W. DUDAS
*Acting Director of the United States Patent and Trademark Office*